(12) United States Patent
Uesugi et al.

(10) Patent No.: US 11,770,611 B2
(45) Date of Patent: Sep. 26, 2023

(54) SHAKE DETECTION APPARATUS, SHAKE DETECTION METHOD, AND IMAGE BLUR CORRECTION APPARATUS

(71) Applicant: CANON KABUSHIKI KAISHA, Tokyo (JP)

(72) Inventors: Tomomi Uesugi, Kanagawa (JP); Mai Nakabayashi, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 200 days.

(21) Appl. No.: 17/234,860

(22) Filed: Apr. 20, 2021

(65) Prior Publication Data

US 2021/0337127 A1    Oct. 28, 2021

(30) Foreign Application Priority Data

Apr. 23, 2020  (JP) ................. 2020-076854

(51) Int. Cl.
*H04N 23/68*    (2023.01)
*G03B 5/00*    (2021.01)
*G02B 27/64*    (2006.01)
*H04N 23/663*    (2023.01)

(52) U.S. Cl.
CPC ....... *H04N 23/6812* (2023.01); *G02B 27/646* (2013.01); *G03B 5/00* (2013.01); *H04N 23/663* (2023.01); *H04N 23/683* (2023.01); *H04N 23/687* (2023.01)

(58) Field of Classification Search
CPC ........... H04N 5/23251; H04N 5/23258; H04N 5/23264; H04N 5/23267; H04N 5/2327; H04N 5/23274; H04N 5/23277; H04N 5/2328; H04N 5/23283; H04N 5/23287; H04N 23/681; H04N 23/6812; H04N 23/682–687; G02B 27/64; G02B 27/646; G03B 2205/0007–0038
See application file for complete search history.

(56) References Cited

U.S. PATENT DOCUMENTS

| | | | |
|---|---|---|---|
| 9,838,605 B2 | 12/2017 | Tsuchiya | |
| 2016/0173781 A1* | 6/2016 | Tsuchiya | H04N 23/6812 348/208.7 |
| 2021/0092296 A1* | 3/2021 | Kuribayashi | H04N 23/6812 |
| 2021/0409603 A1* | 12/2021 | Kajimura | H04N 23/663 |

FOREIGN PATENT DOCUMENTS

JP    2015-141391 A    8/2015

* cited by examiner

*Primary Examiner* — Paul M Berardesca

(74) *Attorney, Agent, or Firm* — Cowan, Liebowitz & Latman, P.C.

(57) ABSTRACT

An image pickup apparatus is provided with an image blur correction apparatus that corrects image blur of a captured image by using a shake detection signal that has been detected by a shake detection unit. A controller for image blur correction generates a first signal obtained by multiplying an output signal of the shake detection unit by a first correction ratio gain. A second signal is generated by multiplying the sum of the output signal of the shake detection unit that has passed through a low-pass filter and the output signal of the shake detection unit that has passed through a high-pass filter by a second correction ratio gain. A target generating unit generates a target value signal for image blur correction based on the sum of the first and second signals and drives the shake correction unit.

29 Claims, 11 Drawing Sheets

SHAKE DETECTION APPARATUS, SHAKE DETECTION METHOD, AND IMAGE BLUR CORRECTION APPARATUS

BACKGROUND OF THE INVENTION

Field of the Invention

The present invention relates to a technique that detects a camera shake and the like and corrects image blur of an image in an optical device and an image pickup apparatus.

Description of the Related Art

An image blur correction function is a function for suppressing the influence of shaking on an image, and is used in various types of image pickup apparatuses. For example, in a lens interchangeable image pickup system in which a lens device can be mounted on a camera body, a shake detection means, for example, a gyro sensor, is provided in at least one of the lens devices and the camera body. Additionally, at least one of the lens devices and the camera body is provided with an image blur correction means.

In a camera system disclosed in Japanese Patent Laid-Open No. 2015-141391, a shake detection means provided in each of a lens unit and a camera body detects shaking. Image blur correction is performed in each of the lens unit and the camera body in accordance with shake detection signals, so that a range for blur correction performed by both the lens unit and the camera body can be effectively used, and a range for shake correction can be expanded.

However, if there is a difference in the detection performance between the shake detection means provided in the lens device and the shake detection means provided in the camera body, drawbacks described below arise. The difference in the detection performance relates to a noise characteristic of the output of the shake detection means in a stationary state, and variation of the output at a high frequency (white noise), and variation of the output at a low frequency (referred to as "random walk" and "1/f fluctuation") are generally known.

For example, a case is assumed in which, from among the shake detection means provided in each of the lens devices and the camera body, the detection performance of a first detection means, which is one of the shake detection means, is relatively lower than that of a second shake detection means, which is the other one of the shake detection means. In this case, when an image blur correction operation is performed in each of the lens devices and the camera body, the correction accuracy may be lowered as compared with a case in which the image blur correction operation is performed only in response to a shake detection signal of the second shake detection means. That is, the detection performance of the second shake detection means cannot be fully utilized.

SUMMARY OF THE INVENTION

A shake detection apparatus according to an embodiment of the present invention comprises first and second detectors configured to detect shaking; at least one processor and at least one memory functioning as a signal processing unit configured to process first and second detection signals output by each of the first and second detectors, the signal processing unit comprising a first filter unit configured to have a first transmission characteristic determined by a noise density ratio of the first and second detection signals; a second filter unit configured to have a second transmission characteristic in which the sum with a value of the first transmission characteristic is a predetermined value; and an output unit configured to output a shake detection signal generated based on a signal processed by the first filter unit and a signal processed by the second filter unit.

Further features of the present invention will become apparent from the following description of exemplary embodiments with reference to the attached drawings.

DESCRIPTION OF THE EMBODIMENTS

Embodiments of the present invention will be described in detail below with reference to the drawings. The present invention is applicable, for example, to a video camera, a digital still camera, and an interchangeable lens, and is suitable for an image pickup system having a plurality of shake detection means. In each embodiment, an example of an image pickup apparatus provided with an image blur correction apparatus that performs image blur correction of a captured image by using a plurality of shake detection signals will be described.

First Embodiment

Figure 1A:
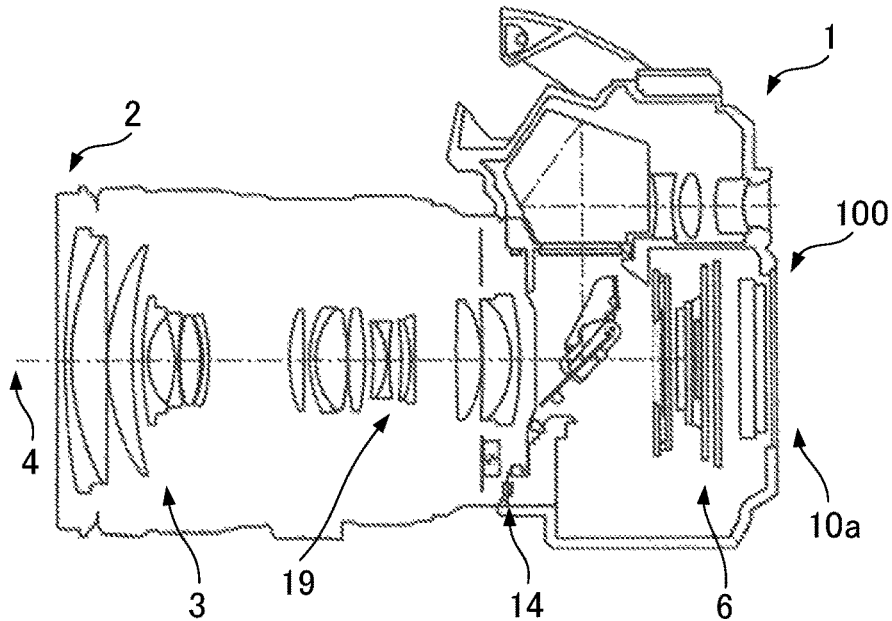
FIG. 1A is a central cross-sectional view of an image pickup apparatus and FIG. 1B is a block diagram of an electrical configuration of the image pickup apparatus according to the embodiments.
Figure 1B:
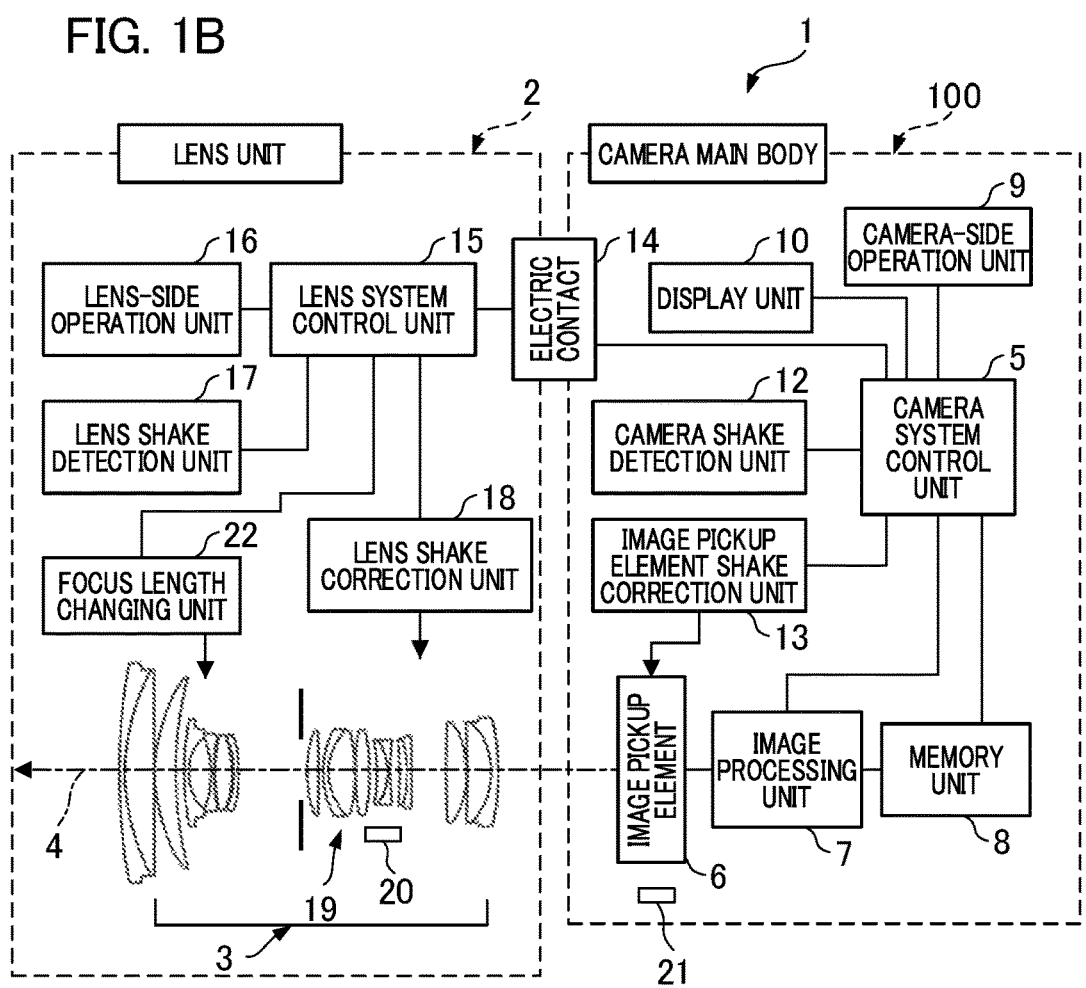

An image pickup apparatus according to the present embodiment will be described with reference to FIG. 1 to FIG. 7. FIG. 1A is a central cross-sectional view of an image pickup apparatus and FIG. 1B is a block diagram illustrating an electrical configuration of the image pickup apparatus. An image pickup apparatus 1 can mount a lens unit 2 on a main body 100 thereof. An imaging optical system 3 includes optical members such as a plurality of lenses and a diaphragm. In FIGS. 1A and 1B, an optical axis 4 of the image pickup optical system 3 is shown by dotted-dashed line. Hereinafter, the positional relation of each unit will be described by defining the object side as the front side.

The main body 100 includes an image pickup element 6 and a rear display device 10a. The main body 100 and the lens unit 2 are electrically connected via an electric contact 14. In this state, the camera system control unit (hereinafter, referred to as a "camera control unit") 5 in the main body 100 and a lens system control unit (hereinafter, referred to as a "lens control unit") 15 in the lens unit 2 can communicate with each other. The main body 100 and the lens unit 2 are each provided with a shake detection means and an image blur correction means thereby to enable image blur correction for a captured image. For example, the imaging optical system 3 includes an image blur correction unit 19 in which image blur correction is performed by driving a correction lens. The main body 100 is also provided with a driving mechanism of an image pickup element 6, and image blur correction is performed by driving (moving or rotating) the image pickup element 6.

In the image pickup system shown in FIG. 1B, the main body 100 includes a camera control unit 5, the image pickup element 6, an image processing unit 7, a memory unit 8, an operation unit 9, and a display unit 10. The image pickup element 6 configures an image pickup unit together with the imaging optical system 3. The image processing unit 7 processes an image pickup signal output from the image pickup element 6. A recording/reproducing unit includes the memory unit 8 and the display unit 10, and performs recording, reproducing, and display of image data. The display unit 10 includes the rear display device 10a and an electronic viewfinder, and performs display processing for a captured image, display information, and the like. The camera control unit 5 includes a CPU (central processing unit), and integrally controls each component of the image pickup system according to an operation instruction signal detected by the operation unit 9.

An image blur correction function of the main body 100 is realized by the camera control unit 5 by using a camera shake detection unit 12, a shake correction unit 13, and a position detection unit 21 of the image pickup element 6. The camera shake detection unit 12 detects a shake amount of the main body 100 and outputs a shake detection signal to the camera control unit 5. The shake correction unit 13 that drives the image pickup element 6 performs image blur correction by moving or rotating the image pickup element 6 in accordance with a control instruction of the camera control unit 5.

In contrast, the lens unit 2 includes the image pickup optical system 3, the lens control unit 15, an operation unit 16, a lens shake detection unit 17, a shake correction unit 18, and a focus length changing unit 22. The lens control unit 15 includes a CPU and controls each component in the lens unit 2 in response to an operation instruction signal detected by the operation unit 16 and a control instruction from the camera control unit 5.

The image blur correction function of the lens unit 2 is realized by the lens control unit 15 by using the lens shake detection unit 17, a shake correction unit 18, the image blur correction unit 19, and a position detection unit 20. The lens shake detection unit 17 detects a shake amount of the lens unit 2, and outputs a shake detection signal to the lens control unit 15. The image blur correction unit 19 has a correction lens and the position detection unit 20 that detects the position of the correction lens. The correction lens is, for example, a shift lens that is movable in an arbitrary direction in a plane orthogonal to the optical axis 4 of the image pickup optical system. A shake correction unit 18 performs image blur correction by driving the correction lens in accordance with a control instruction from the lens control unit 15.

The image pickup optical system 3 includes a plurality of lens groups and a diaphragm, and the lens control unit 15 controls a shooting angle of view (zoom in and out) by using the focus length changing unit 22, and controls focus adjustment, exposure operation, and the like.

As disclosed above, in the image pickup system, a first image blur correction operation is performed in the main body 100, and a second image blur correction operation is performed in the lens unit 2. The principal units of the control system of the image pickup system are the camera control unit 5 and the lens control unit 15, and both units can control image blur correction in cooperation with each other. Specific control will be described below.

The shake detection units 12 and 17 each can detect shaking applied to the main body 100 and the lens unit 2, in which, for example, a gyro sensor (angular velocity sensor) is used. The shake correction unit 13 includes a mechanism for driving the image pickup element 6 on a plane perpendicular to the optical axis 4. The shake correction unit 13 has a driving unit using, for example, a magnet and a flat coil. The position detection unit 21 of the image pickup element 6 has, for example, a magnet and a Hall element.

The camera shake detection unit 12 detects a shake amount of the main body 100. The camera control unit 5 acquires a detection signal of the camera shake detection unit 12, and controls the driving of the image pickup element 6 through the shake correction unit 13. The shake correction unit 13 acquires a position detection signal of the image blur correction unit including the image pickup element 6 from the position detection unit 21. Feedback control is performed based on the position detection signal and a control target signal of the image blur correction unit.

In contrast, the shake correction unit 18 of the lens unit 2 is provided with a mechanism for driving the correction lens on a plane perpendicular to the optical axis 4. The correction lens is a movable optical member, for example, a shift lens and a tilt lens, and a driving mechanism using an electromagnetic driving unit (coil, magnet) and the like is used. The lens shake detection unit 17 detects a shake amount of the lens unit 2. The lens control unit 15 acquires a detection signal of the lens shake detection unit 17, and controls driving of the correction lens through the shake correction unit 18. The shake correction unit 18 acquires a position detection signal of the correction lens from the position detection unit 20 having, for example, a magnetic detection element (Hall element). Feedback control is performed based on the position detection signal and the control target signal of the image blur correction lens.

In the image pickup system of FIGS. 1A and 1B, light from an object forms an image on the image pickup plane of the image pickup element 6 through the image pickup optical system 3. An evaluation value of a focus detection state and an appropriate exposure amount are acquired based on a signal from the image pickup element 6. In response to an instruction from the camera control unit 5, the lens control unit 15 adjusts the image pickup optical system 3 to expose the image pickup element 6 with an appropriate amount of object light. The image pickup element 6 performs photoelectric conversion on the object image that has been imaged and outputs an electric signal.

The image processing unit 7 has, for example, an A/D converter, a white balance adjustment circuit, a gamma correction circuit, and an interpolation calculation circuit, and generates image data for recording. The image processing unit 7 is provided with a color interpolation processing unit and performs color interpolation (demosaic) processing based on signals of the Bayer pattern to generate a color image. The image processing unit 7 also compresses data such as an image, a moving image, and sound by using a predetermined method. The image processing unit 7 can also generate a shake detection signal (motion vector) based on a comparison result between a plurality of images that has been acquired by the image pickup element 6. In this case, the image pickup element 6 and the image processing unit 7 can configure the shake detection member of the main body 100.

The memory unit 8 includes a nonvolatile memory and stores the acquired image data. In accordance with the instruction from the camera control unit 5, a signal is output from the image processing unit 7 to the memory unit 8, and the image data that have been read from the memory unit 8 are displayed on the screen of the display unit 10 and presented to a user. The display unit 10 is provided with a display device that displays a variety of information in accordance with the instruction from the camera control unit 5. When the rear display device 10a has a touch panel, an operation performed on the screen by the user can be detected, and a contact detection device is included in the operation unit 9.

The camera control unit 5 generates a timing signal and the like during image-pickup and outputs it to each unit. The camera control unit 5 controls each of a circuit unit of an image pickup system, a circuit unit of an image processing system, and a circuit unit of a recording/reproducing system in accordance with an operation instruction signal from the operation unit 9. For example, the operation unit 9 detects pressing of a shutter release button and outputs an operation detection signal to the camera control unit 5. The camera control unit 5 controls, for example, the driving of the image pickup element 6 and the operation of the image processing unit 7. The operations of each unit of the image pickup apparatus 1 are controlled in accordance with the user operation detected by the operation unit 9, so that still images and moving images can be captured.

Next, an adjusting operation of the image pickup optical system 3 will be described. The image processing unit 7 calculates an appropriate focus position and an appropriate aperture value based on the output signal of the image pickup element 6. The camera control unit 5 controls photometric and distance measuring operations based on the output signal of the image pickup element 6, and determines exposure conditions (for example, an F-number and a shutter speed).

The camera control unit 5 transmits an instruction signal to the lens control unit 15 via the electric contact 14, and the lens control unit 15 appropriately controls the focus length changing unit 22 and a diaphragm driving unit (not illustrated). Additionally, in the image blur correction mode, the camera control unit 5 and the lens control unit 15 appropriately control the shake correction units 13 and 18 based on the shake detection signals acquired from the shake detection units 12 and 27 and the position detection signals from the position detection units 20 and 21. The operation of each unit of the image pickup apparatus 1 is controlled in accordance with the operation instruction from the user detected by the operation unit 9, and thereby, still images and moving images can be obtained in which image blur caused by camera shake or the like has been corrected.

Figure 2:
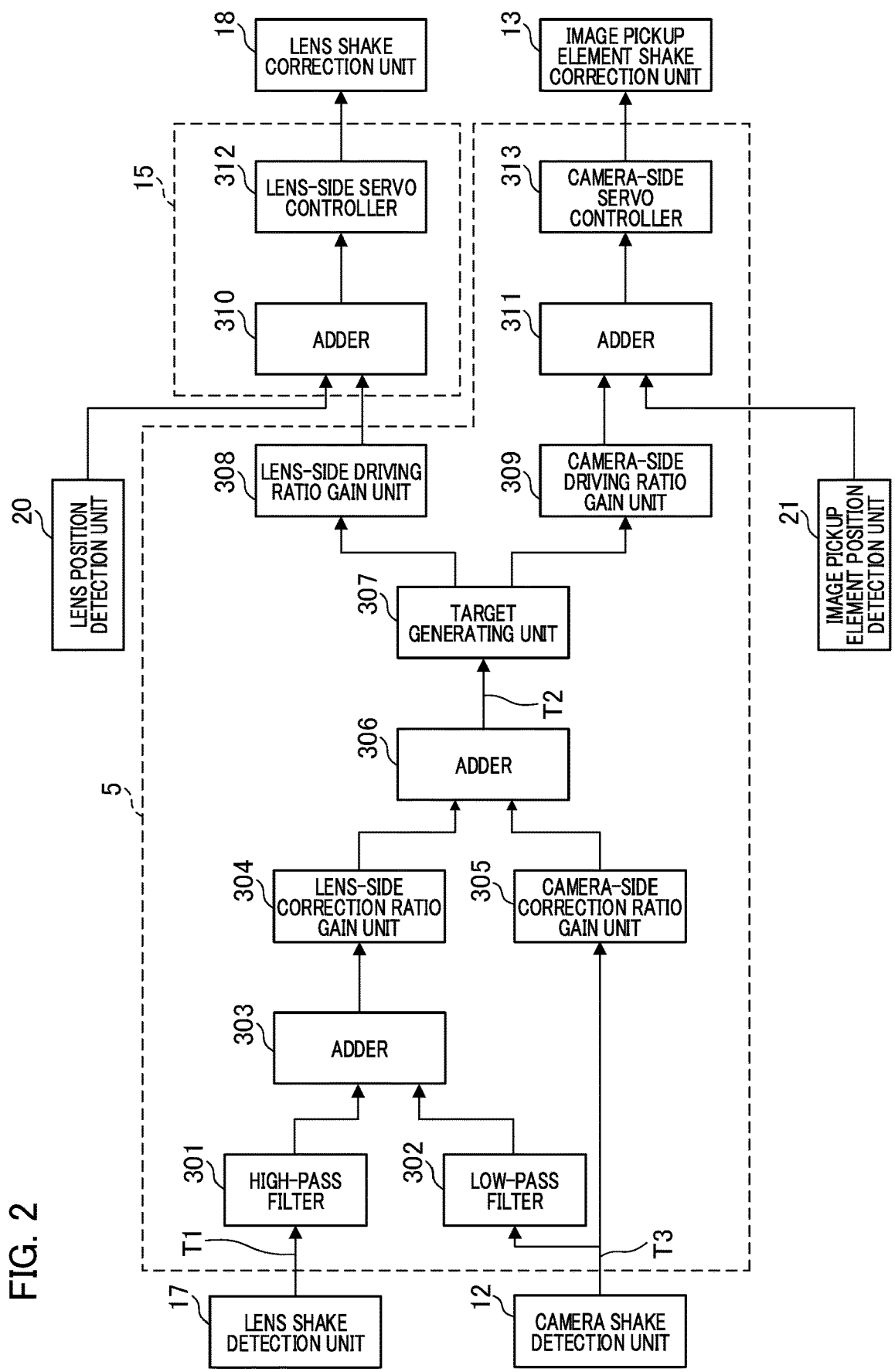
FIG. 2 is a block diagram illustrating a control configuration of image blur correction according to the first embodiment.

Referring to FIG. 2, a configuration of the image blur correction control unit according to the present embodiment will be described. FIG. 2 is a block diagram illustrating a configuration example of signal processing for processing each detection signal acquired from the lens shake detection unit 17 and the camera shake detection unit 12. This signal processing is performed by either the lens control unit 15 or the camera control unit 5. In the present embodiment, it is assumed that the camera control unit 5 performs this operation. Addition of negative values, that is, subtraction, is included in the addition processing performed by a plurality of adders shown in FIG. 2 and other drawings.

The detection signal of the lens shake detection unit 17 is acquired by a high-pass filter 301 to extract a high frequency component. Additionally, the detection signal of the camera shake detection unit 12 is input to a low-pass filter 302 and a camera-side correction ratio gain unit 305. The low-pass filter 302 acquires the detection signal of the camera shake detection unit 12 and extracts a low frequency component.

From among a plurality of correction ratio gains related to the control of image blur correction, a first correction ratio gain is defined as a camera-side correction ratio gain, and a second correction ratio gain is defined as a lens-side correction ratio gain. The camera-side correction ratio gain unit 305 acquires a detection signal of the camera shake detection unit 12, and outputs a signal obtained by multiplying the detection signal by a first correction ratio gain. Each of the outputs of the high-pass filter 301 and the low-pass filter 302 is added by an adder 303. A lens-side correction ratio gain unit 304 acquires the added output signal and outputs a signal obtained by multiplying the output signal by a second correction ratio gain.

An adder 306 acquires and adds each output signal of the correction ratio gain units 304 and 305. The added output signal is input to a target generating unit 307 to generate a control target signal for image blur correction. From among a plurality of driving ratio gains for determining the ratio of the drive control of the image blur correction means, a first driving ratio gain is defined as a camera-side driving ratio gain, and a second driving ratio gain is defined as a lens-side driving ratio gain. Both the first and second driving ratio gains are positive values, and the sum of the values is 1. A camera-side driving ratio gain unit 309 outputs a signal that has been obtained by multiplying the control target signal by a first driving ratio gain to an adder 311. A lens-side driving ratio gain unit 308 outputs a signal that has been obtained by multiplying the control target signal by a second driving ratio gain to an adder 310.

The adder 311 acquires the output signal of the camera-side driving ratio gain unit 309 and the position detection signal of the position detection unit 21, performs a difference calculation, and outputs a calculated deviation signal to a camera-side servo controller 313. The camera-side servo controller 313 controls the shake correction unit 13 based on the deviation signal. The adder 310 acquires the output signal of the lens-side driving ratio gain unit 308 and the position detection signal of the position detection unit 20, performs a difference calculation, and outputs a calculated deviation signal to a lens-side servo controller 312. The lens-side servo controller 312 controls the shake correction unit 18 based on the deviation signal.

In the present embodiment, since the camera control unit 5 performs the signal processing for the shake detection signals, the lens control unit 15 transmits the output signal of the lens shake detection unit 17 to the camera control unit 5 via the electric contact 14. In the signal processing, the output signal of the lens-side driving ratio gain unit 308 is transmitted to the lens control unit 15 via the electric contact 14. The lens control unit 15 executes processes for the adder 310 and the lens-side servo controller 312, and the camera control unit 5 executes processes for the adder 311 and the camera-side servo controller 313. These processes are realized by the CPU executing a predetermined control program.

The camera control unit 5 and the lens control unit 15 can communicate with each other via the electric contact 14. The communication speed in the transfer/reception of a signal via the electric contact 14 is set to a speed value corresponding to a sufficiently high frequency with respect to a frequency band for a target of shake correction, and bands for shake correction performed by the shake correction units 18 and 13. A communication speed corresponding to a transfer/reception interval of a signal in communication between the camera control unit 5 and the lens control unit 15 is determined in accordance with a protocol determined between both control units while the lens unit 2 is mounted on the main body 100.

Next, image blur correction processing in the image pickup apparatus 1 will be explained. It is assumed that the shake correction units 18 and 13 of each of the lens unit 2 and the main body 100 are driven in the same manner based on the shake detection signals of both the shake detection units 17 and 12. In this case, the image blur correction performance may deteriorate due to double corrections performed to shaking that has actually been detected. Accordingly, in the present embodiment, the lens-side correction ratio gain unit 304 and the camera-side correction ratio gain unit 305 determine the ratio of the sharing of at what proportion each of the shake correction units 18 and 13 performs shake correction with respect to the actually detected shake amount. The camera-side correction ratio gain corresponds to a first proportional gain and the lens-side correction ratio gain corresponds to a second proportional gain. The first and second proportional gains are both positive values, and the sum of the values is 1. For example, when the lens-side correction ratio gain and the camera-side correction ratio gain are each set to 0.5, the shake correction units 18 and 13 perform image blur correction by each sharing 50% with respect to the detected shake amounts. By simultaneously driving the correction lens and the image pickup element 6, 100% of image blur correction can be performed.

The camera control unit 5 acquires a shake detection signal (T1 in FIG. 2) from the lens shake detection unit 17 and a shake detection signal (T3 in FIG. 2) from the camera shake detection unit 12. The shake detection signal T1 is processed by the high-pass filter 301 and its output is input to the adder 303. The shake detection signal T3 is processed by the low-pass filter 302 and its output is input to the adder 303. The signal after addition performed by the adder 303 is processed by the lens-side correction ratio gain unit 304 and subsequently input to the adder 306.

The shake detection signal T3 is processed by the camera-side correction ratio gain unit 305 and subsequently input to the adder 306. The signal after the addition performed by the adder 306 (T2 in FIG. 2) is input to the target generating unit 307. For example, when the lens shake detection unit 17 and the camera shake detection unit 12 are each provided with a gyro sensor, the output signals thereof are angular velocity detection signals. The target generating unit 307 integrates the detection signal of the angular velocity to convert it into a signal of the angle and outputs a signal of the target value for the image blur correction. The output signal of the target generating unit 307 is input to the lens-side driving ratio gain unit 308 and the camera-side driving ratio gain unit 309.

In the image blur correction control related to the lens unit 2, the output signal of the lens-side driving ratio gain unit 308 is received by the lens control unit 15 via the electric contact 14 and input to the adder 310. The adder 310 performs a difference calculation between a signal of the target value multiplied by the lens-side driving ratio gain and a position detection signal of the position detection unit 20, and outputs a deviation signal. The lens-side servo controller 312 generates and outputs a driving signal to the shake correction unit 18 based on a deviation signal.

In the image blur correction control related to the image pickup element 6, the output signal of the camera-side driving ratio gain unit 309 is input to the adder 311. The adder 311 performs a difference calculation between the signal of the target value multiplied by the camera-side driving ratio gain and the position detection signal of the position detection unit 21, and outputs a deviation signal. The camera-side servo controller 313 generates and outputs a driving signal to the shake correction unit 13 based on the deviation signal.

The servo controllers 312 and 313 are each configured by a feedback controller, for example, a PID controller. The PID controller has a known configuration in which each of the proportional, integral, and differential control is performed. Note that the present invention is not limited to thereto, and various types of controllers can be used.

In the present embodiment, since the target value output from the target generating unit 307 is angle information, the shake correction unit 13 needs to convert the target value into a driving amount of the image pickup element 6 and drive it. Similarly, the shake correction unit 18 needs to convert the target value into a driving amount of the image blur correction unit 19 and drive it. Note that, in addition to using the target value for image blur correction as the angle information, there is, for example, a method for generating a target value of the driving amount of the image pickup element 6. In this case, a process for converting the target value into the driving amount of the image blur correction unit 19 is performed only in the shake correction unit 18.

The lens-side driving ratio gain unit 308 and the camera-side driving ratio gain unit 309 determine each gain in accordance with a ratio of the driving strokes of the shake correction units 18 and 13. For example, in a lens device having a long focus length, when the driving stroke of the shake correction unit 18 is longer than that of the shake correction unit 13, the lens-side driving ratio gain is determined to be higher than the camera-side driving ratio gain.

When the lens shake detection unit 17 and the camera shake detection unit 12 in the image pickup system each can detect the shaking accurately, the shake correction units 18 and 13 are driven at the same time at a predetermined ratio, and consequently image blur correction can advantageously be performed. In the interchangeable lens type camera system, the combination of the lens unit 2 and the main body 100 may cause a difference in the detection performance between the lens shake detection unit 17 and the camera shake detection unit 12. Regarding the shake output, there are, for example, variation at a high frequency (white noise) and variation at a low frequency (Random walk, 1/f fluctuation, and temperature drift). According to the present embodiment, it is possible to handle even a case having a difference in the characteristic between the shake detection means provided in each of the main body and the lens device. That is, the image blur correction can be performed advantageously by the signal processing using, for example, the high-pass filter 301, the low-pass filter 302, the correction ratio gain units 304 and 305.

In FIG. 2, the adder 303 calculates the sum of the signal in which the shake detection signal of the lens shake detection unit 17 has been processed by the high-pass filter 301, and the signal in which the shake detection signal of the camera shake detection unit 12 has been processed by the low-pass filter 302. Specifically, the signal in which the signal component of the lens shake detection signal in the high frequency band remains without change, and the signal component of the lens shake detection signal in which the low frequency band has been replaced with the signal component of the camera shake detection signal in the low frequency band is output. This configuration is effective when, in the detection performance for the variation at the low frequency (noise characteristic), the lens shake detection unit 17 is lower than the camera shake detection unit 12.

In contrast, when the detection performance for the variation at the low frequency of the camera shake detection unit 12 is lower than that of the lens shake detection unit 17, a different configuration is adopted. In this case, a high frequency band signal component obtained by processing the output signal of the camera shake detection unit 12 by the high-pass filter 301 and a low frequency band signal component obtained by processing the output signal of the lens shake detection unit 17 by the low-pass filter 302 are input to the adder 303. Specifically, the signal in which the signal component of the camera shake detection signal in the high frequency band remains without change and the signal component of the lens shake detection signal in the low frequency band has been replaced is output. By adopting the above configurations, it is possible to suppress the increase of the low frequency noise included in the target value of image blur correction due to the shake detection means in which the variation is large at the low frequency.

Figure 3A:
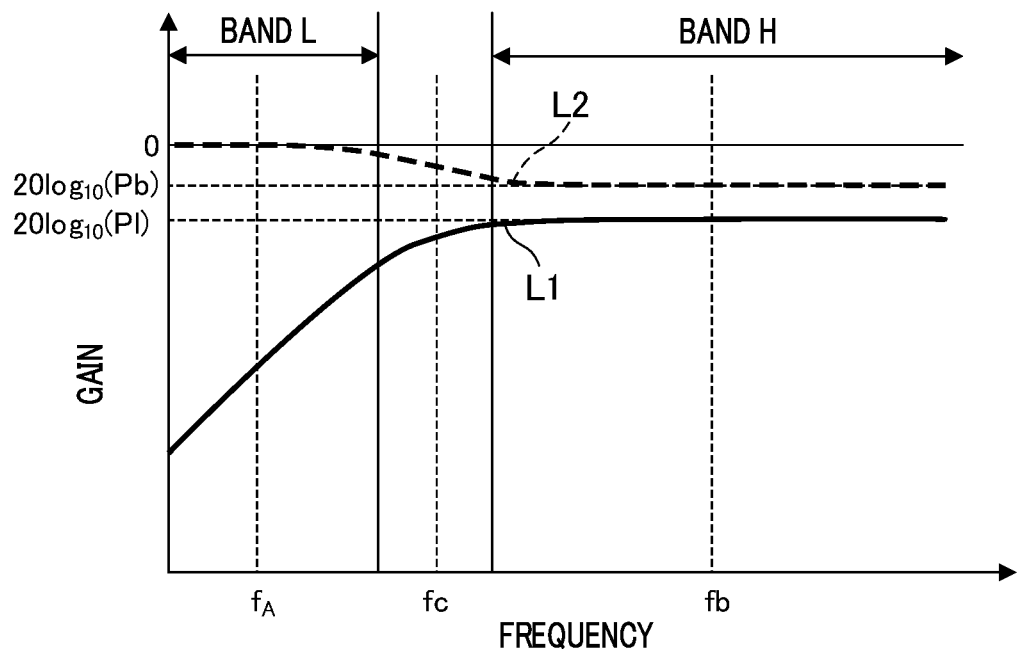
FIGS. 3A and 3B illustrate a transmission characteristic of an image blur correction control unit according to the embodiments.
Figure 3B:
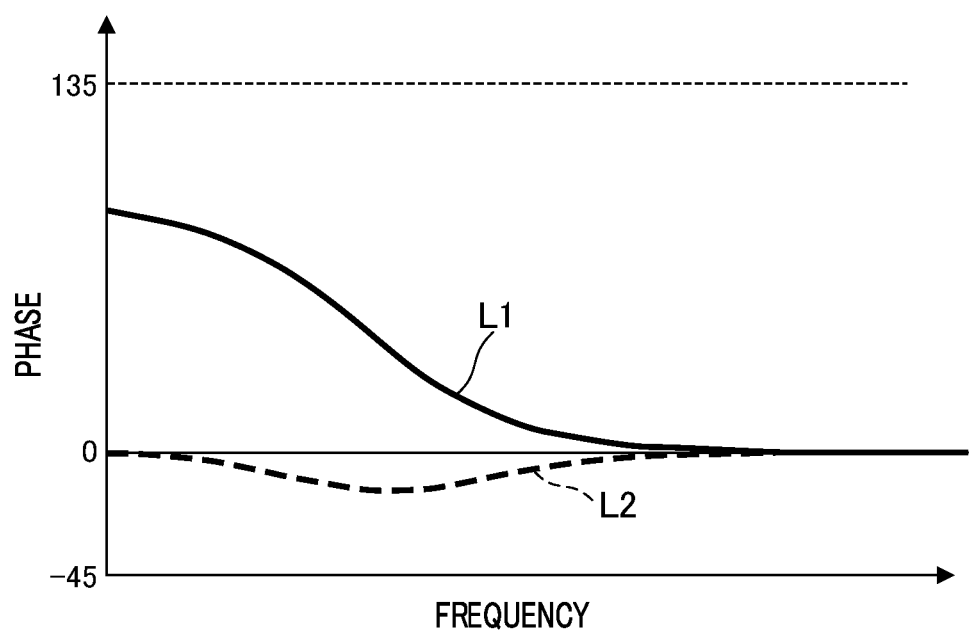

Next, with reference to FIG. 3 to FIG. 7, the effect of the image blur correction control according to the present embodiment will be described. FIGS. 3A and 3B are explanatory views of an operation and effect of the low-pass filter 302 and the high-pass filter 301. FIG. 3A is a graph showing a frequency characteristic of the gain and FIG. 3B is a graph showing a frequency characteristic of the phase. In both FIGS. 3A and 3B, the horizontal axis represents the frequency axis, the vertical axis in FIG. 3A represents the gain axis, and the vertical axis in FIG. 3B represents the phase axis.

The graph shown by solid lines L1 in FIGS. 3A and 3B shows the transmission characteristic related to the output noise of the lens shake detection unit 17 from T1 (output of the lens shake detection unit 17) to T2 (output of the adder 306) shown in FIG. 2. The graph shown by a dashed line L2 represents the transmission characteristic related to the output noise of the camera shake detection unit 12 from T3 (output of the shake detection unit 12) to T2 shown in FIG. 2.

An amount that indicates the frequency characteristic of the low-pass filter 302 (transfer function) is denoted by "K". An amount that indicates the frequency characteristic of the high-pass filter 301 is set to "1-K". Further, the camera-side correction ratio gain is denoted by "Pb" and the lens-side correction ratio gain is denoted by "Pl". The transmission characteristics shown by the solid line L1 and the dashed line L2 can be expressed as follows.

(Transmission characteristic shown by the solid line
L1)=$Pl \times (1-K)$  (1)

(Transmission characteristic shown by the dashed
line L2)=$Pb + Pl \times K$  (2)

Formula (1) indicates the characteristic of converging to Pl on the high frequency side, in which the gain value shown by the solid line L1 in FIG. 3A converges to $20 \log_{10}(Pl)$. Formula (2) indicates the characteristic of converging to Pb on the high frequency side, in which the gain value shown by the dashed line L2 in FIG. 3A converges to $20 \log_{10}(Pb)$.

The transmission characteristic indicated by formula (2) is a first filter characteristic when the process from T3 to T2 is performed to the camera shake detection unit 12. The transmission characteristic indicated by formula (1) is a second filter characteristic when the process from T1 to T2 is performed on the lens shake detection unit 17. The sum of the value shown in formula (1) and the value shown in formula (2) is 1. The process performed by each of the components from the lens shake detection unit 17 and the camera shake detection unit 12 on the adder 306 correspond to the shake detection process.

Next, a method for setting a cutoff frequency of the frequency characteristic K of the low-pass filter 302 will be described. In FIG. 3A, the cutoff frequency is denoted by "fc". The notation "$f_A$" indicates a frequency less than "fc", and "$f_B$" indicates a frequency larger than "fc". The cutoff frequency "fc" is determined in accordance with the characteristic of the noise density of each of the output signals of the lens shake detection unit 17 and the camera shake detection unit 12.

Figure 4:
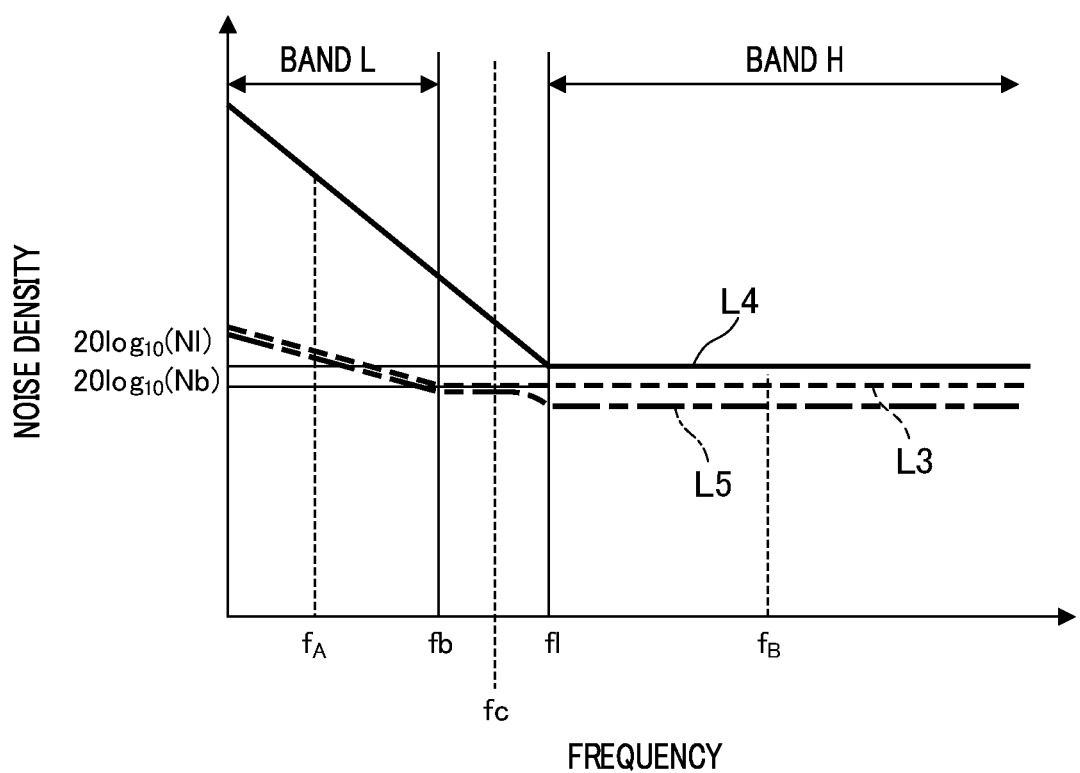
FIG. 4 illustrates a frequency characteristic of a noise of a shake detection unit according to the embodiments.

With reference to FIG. 4, a method for determining the cutoff frequency fc in accordance with the characteristic of the noise density will be described. FIG. 4 is a graph showing a frequency characteristic of the noise density of the shake output. The horizontal axis represents the frequency axis and the vertical axis represents the noise density, that is, the power spectrum density of noise in the output signal of the shake detection means. A low frequency band L and a high frequency band H are shown by using the cutoff frequency fc as a reference.

The graph shown by a dashed line L3 in FIG. 4 represents a characteristic of the noise density of the output signal of the camera shake detection unit 12. The graph shown by a solid line L4 represents a characteristic of the noise density of the output signal of the lens shake detection unit 17 in a stationary state. The graph shown by a dashed-dotted line L5 represents a characteristic of the noise density of the output signal at T2 in the stationary state. When the shake detection unit has a gyro sensor, the characteristics of the noise density of the shake output is that white noise is dominant on the high frequency side, and random walk and 1/f fluctuation are dominant on the low frequency side.

For example, regarding the characteristic of the noise density of the output signal of the lens shake detection unit 17 (solid line L4), a first band having a feature in which the noise density is constant is a band where white noise is dominant. A second band having a feature in which the noise density relatively increases as the frequency decreases is a band in which random walk and 1/f fluctuation are dominant. In the second band, as the tilt showing the noise density increases, the random walk and 1/f fluctuation increase. The noise performance related to the variation of the shake output at a low frequency increases as the tilt showing the noise density decreases in the second band. In the present embodiment, the noise performance of the lens shake detection unit 17 for the variation at a low frequency is lower than the noise performance of the camera shake detection unit 12. Hence, as for the tilt showing the noise density at the low frequency, the tilt shown by the solid line L4 is larger than that shown by the dashed line L3.

The cutoff frequency fc can be set by comparing the characteristic of the noise density of each output signal of the lens shake detection unit 17 and the camera shake detection unit 12. That is, in each characteristic of the noise density, a frequency (switching frequency) at which the first band in which white noise is dominant and the second band in which random walk and 1/f fluctuation are dominant are switched is clarified. The cutoff frequency fc of the low-pass filter 302 is set in a frequency band between a frequency having a small switching frequency and a frequency having a large switching frequency. Specifically, in FIG. 4, the switching frequency of the noise density of the camera shake detection unit 12 is denoted by "fb" and the switching frequency of the noise density of the lens shake detection unit 17 is denoted by "fl". The frequency fb is smaller than the frequency fl (fb<fl). Hence, the cutoff frequency fc is set to a frequency between the frequency fb and the frequency fl (fb<fc<fl). The high frequency band H is a frequency band higher than the frequency fl, and the low frequency band L is a frequency band lower than the frequency fb.

By setting the cutoff frequency fc as described above, the tilt showing the noise density (L5) on the low-frequency side of the signal that is output at T2 aligns with the tilt showing the noise density (L3) on the low-frequency side of the signal T3 output by the camera shake detection unit 12. Accordingly, a signal output from the lens shake detection unit 17 is a signal in which a signal component of the output signal of the lens shake detection unit 17 in the low frequency band is replaced with a signal component of the output signal of the camera shake detection unit 12 in the low frequency band, and a signal component of the signal of the lens shake detection unit 17 in the high frequency band remains unchanged. Specifically, the signal component in the low frequency band of the shake detection means having a relatively low noise performance for the variation at the low frequency is replaced with the corresponding signal component of the shake detection means having a relatively high noise performance. Therefore, it is possible to suppress the deterioration of the performance of the noise characteristic in the low frequency band.

Next, a method for setting the camera-side correction ratio gain Pb and the lens-side correction ratio gain Pl will be described with reference to FIG. 3A and FIG. 4. On the high frequency side of the band H shown in FIG. 3A, the correction ratio gain converges as shown by the solid line L1 and the dashed line L2. From among the signals output at T2, a high frequency signal is the sum of a signal obtained by multiplying an output signal of the lens shake detection unit 17 by a correction ratio gain Pl and a signal obtained by multiplying an output signal of the camera shake detection unit 12 by a correction ratio gain Pb. In FIG. 4, with respect to the output noise of the lens shake detection unit 17 (refer to the solid line L4) and the output noise of the camera shake detection unit 12 (refer to the dashed line L3), white noise is dominant in the band H. In the band H, the noise density shown by the dashed line L3 in FIG. 4 is Nb and the noise density shown by the solid line L4 in FIG. 4 is Nl (Nl>Nb).

In the use of two sensors S1 and S2, when weighted addition is performed on the white noise signals output from S1 and S2 at an arbitrary ratio, it is generally known that the white noise signals become smaller than the white noise signals output from S1 and S2. As shown in FIG. 4, the noise density of the noise on the high frequency side (refer to L5) included in the addition signal output at T2 is smaller than the noise density of the lens shake detection unit 17, and is smaller than the noise density of the camera shake detection unit 12. When the noise densities of the output noises of the lens shake detection unit 17 and the camera shake detection unit 12 are the same in the high frequency band, the values of the correction ratio gain Pl and Pb are both 0.5. At this time, the noise density of the noise on the high frequency side (refer to the dashed-dotted line L5) included in the addition signal output at T2 can be minimized.

When the noise densities of the output noises of the lens shake detection unit 17 and the camera shake detection unit 12 are different in the high frequency band, it is necessary to provide a difference between the correction ratio gains Pl and Pb. In the present embodiment, the noise density of the output noise of the lens shake detection unit 17 on the high frequency side is higher than the noise density of the output noise of the camera shake detection unit 12. In this case, the value of the lens-side correction ratio gain Pl is set smaller than the value of the camera-side correction ratio gain Pb, and the correction ratio gain is set so that the noise density of the noise on the high frequency side included in the addition signal at T2 is reduced. This configuration makes it possible to reduce the high frequency noise included in the target value for image blur correction.

Figure 5:
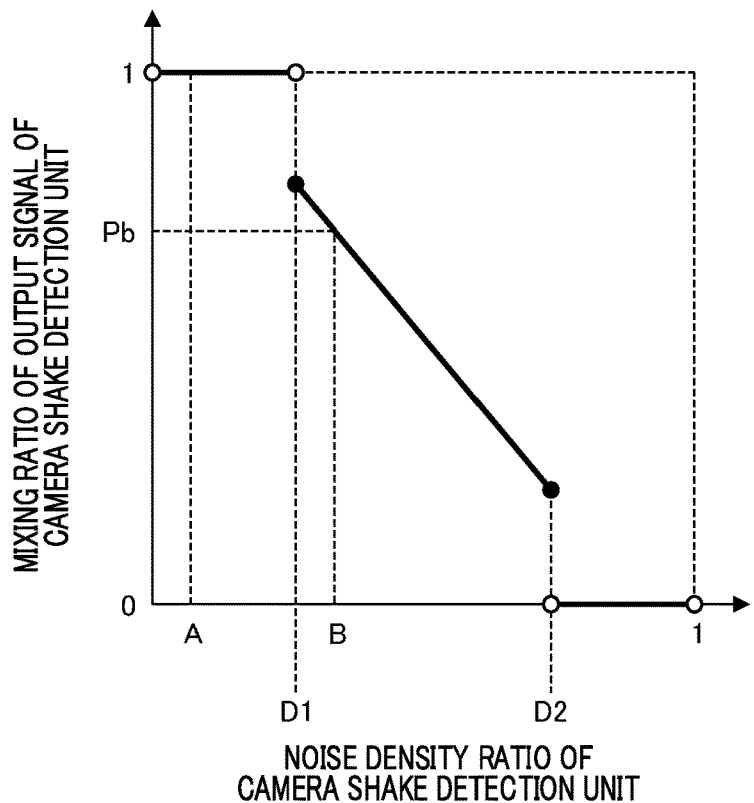
FIG. 5 illustrates the relation between a noise density ratio and a mixing ratio.

With reference to FIG. 5, a method for designing a configuration unit (first filter means) that performs processes T3 to T2 in FIG. 2 will be described. The horizontal axis in FIG. 5 represents a ratio of the noise density of the camera shake detection unit 12 to the sum of the noise densities of the lens shake detection unit 17 and the camera shake detection unit 12. The ratio of the noise density is in a range from 0 to 1. The vertical axis of FIG. 5 represents a mixing ratio of the output signal of the camera shake detection unit 12 to the sum of the output signals of the lens shake detection unit 17 and the camera shake detection unit 12. The mixing ratio (signal combining ratio) is a ratio corresponding to a weighting coefficient for the two signals. D1 indicates a first threshold and D2 indicates a second threshold (D1<D2).

The characteristics shown in the graph of FIG. 5 are as follows.
  In the range in which the ratio of the noise density of the output signal of the camera shake detection unit 12 is less than the threshold D1, the mixing ratio is 1.
  In the range from the threshold D1 or more and the threshold D2 or less, the mixing ratio changes according to the ratio of the noise density of the output signal of the camera shake detection unit 12.
  In the range in which the ratio of the noise density of the output signal of the camera shake detection unit 12 is more than the threshold D2, the mixing ratio is 0.

In the present embodiment, when the ratio of the noise density of the output signal of the camera shake detection unit 12 is between the threshold D1 and the threshold D2, the mixing ratio decreases in a linear relation as the ratio of the noise density increases.

In the frequency $f_A$ shown on the horizontal axis in FIG. 4, if the ratio of the noise density of the output signal of the camera shake detection unit 12 (denoted by "A") is smaller than the first threshold D1, as shown in FIG. 5, the mixing ratio of the output signal of the camera shake detection unit 12 is 1. In the frequency $f_B$ shown on the horizontal axis in FIG. 4, the ratio of the noise density of the output signal of the camera shake detection unit 12 is Nb/(Nb+Nl). When the value (denoted by "B") is larger than the first threshold D1 and smaller than the second threshold D2, the mixing ratio of the output signal of the camera shake detection unit 12 is Pb. That is, the mixing ratio of the output signal of the camera shake detection unit 12 corresponds to the camera-side correction ratio gain.

In the graph of the dashed line L2 shown in FIG. 3A, the gain value is 0 at the frequency $f_A$, and the value of the mixing ratio of the output signal of the camera shake detection unit 12 is 1. Additionally, the gain value at the frequency $f_B$ is 20 $\log_{10}$ Pb, and the value of the mixing ratio is Pb. That is, the characteristic of the first filter means that performs the processes from T3 to T2 in FIG. 2 is determined by the noise density ratio of the output signals of each of the lens shake detection unit 17 and the camera shake detection unit 12.

Figure 6:
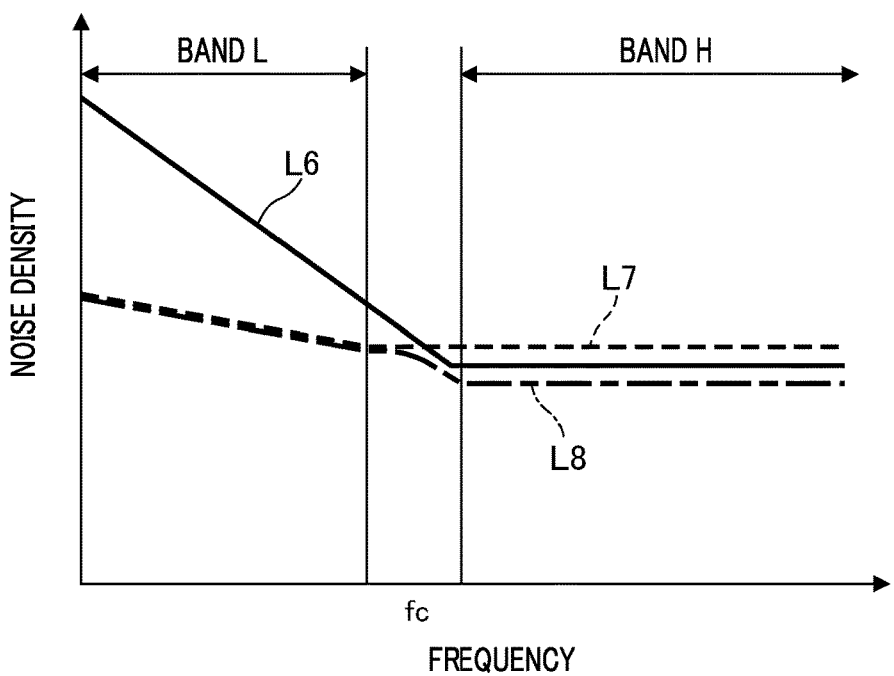
FIG. 6 illustrates a frequency characteristic of the noise density.

FIG. 6 is a graph illustrating an example of the noise density of the output signals of two shake detection means. The horizontal axis represents the frequency axis and the vertical axis represents the noise density. A solid line L6 represents the characteristic of the noise density of the output signal of a first shake detection means, and a dashed line L7 represents the characteristic of the noise density of the output signal of a second shake detection means. In this case, the random walk noise and 1/f noise in the first shake detection means are larger than those in the second shake detection means. In contrast, the white noise in the first shake detection means is lower than that in the second shake detection means. The mixing ratio of the shake detection signal is determined based on the ratio of the noise density related to the first and second shake detection means. After the weighted addition is performed based on the mixing ratio, the characteristic of the noise density shown by a dashed-dotted line L8 in FIG. 6 is obtained. At this time, the ratio of the noise density and the mixing ratio are determined so that the noise density shown by the dashed-dotted line L8 is a relatively small value or less from among the noise densities indicated by the solid line L6 and the dashed line L7.

Figure 7A:
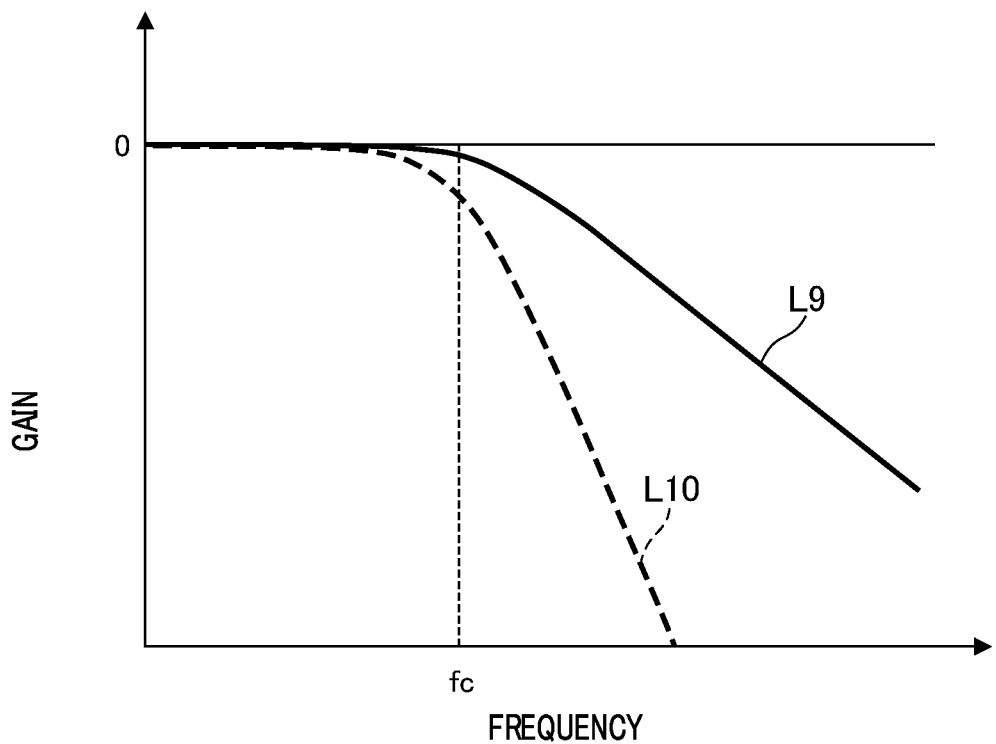
FIGS. 7A and 7B illustrate a characteristic of a low-pass filter according to the embodiments.
Figure 7B:
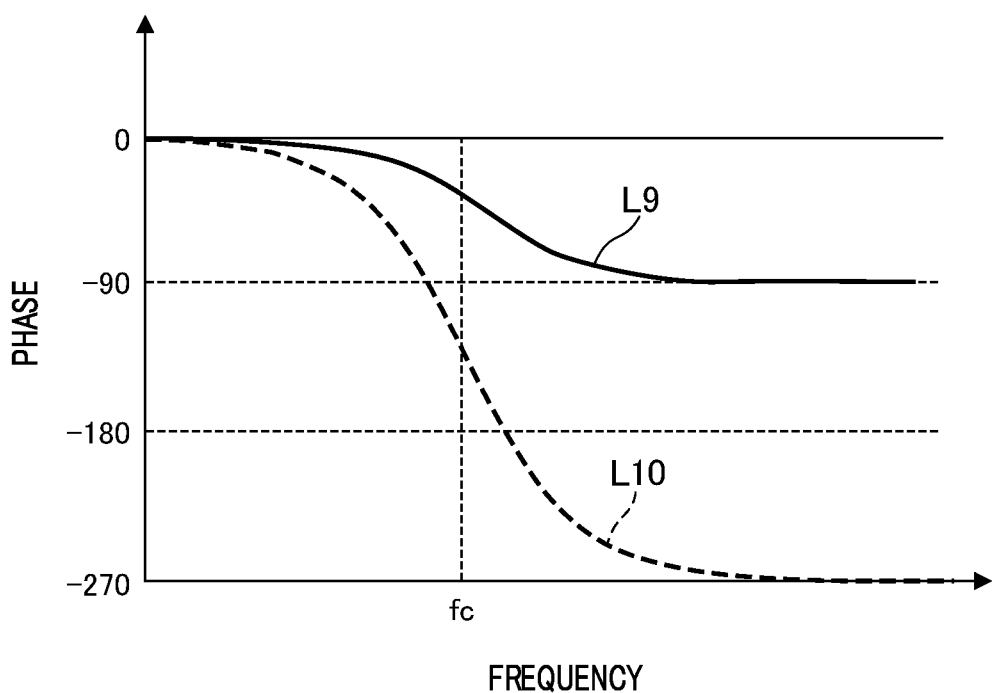

Next, with reference to FIGS. 7A and 7B, the transmission characteristics from T3 to T2 in FIG. 2 for the output signal of the camera shake detection unit 12 in the vicinity of the cutoff frequency fc will be described. FIGS. 7A and 7B illustrate the frequency characteristic K of the low-pass filter 302. FIG. 7A illustrates the frequency characteristic of the gain (vertical axis) and FIG. 7B illustrates the frequency characteristic of the phase (vertical axis). The horizontal axis of each FIGS. 7A and 7B represents the frequency. A solid line L9 indicates that the low-pass filter 302 is a first-order low-pass filter. A dashed line L10 indicates that the low-pass filter 302 is a third-order low-pass filter.

Emphasizing the phase of the frequency characteristic K shown in FIG. 7B, the phase of the frequency characteristic K significantly changes in the vicinity of the cutoff frequency fc. At the phase at the cutoff frequency fc, the solid line L9 is at −45° and the dashed line L10 is at −135°. Hence, the phase of Pl×K, which is the right side's second term expressed in formula (2), of the transmission characteristic from T3 to T2 is the phase shown in FIG. 7B at the cutoff frequency fc. That is, a phase difference occurs between the first term Pb and the second term Pl×K on the right side of formula (2). Hence, the cancel-out effect is generated in the vicinity of the cutoff frequency fc between them. When the gain value shown by the solid line L9 and the gain value shown by the dashed line L10 are the same, the phase shown by the dashed line L10 is larger than the phase shown by the solid line L9, so that the cancel-out effect tends to become large. However, the gain value decreases as the frequency becomes higher than near the cutoff frequency fc. The gain value shown by the solid line L9 is larger than the gain value shown by the dashed line L10, which does not necessarily mean that the dashed line L10 has a relatively high cancel-out effect. Accordingly, in the transmission characteristic from T3 to T2, the order of the low-pass filter 302 is determined in accordance with the values of Pb and Pl so that the cancel-out effect is maximized. This configuration makes it possible to reduce the output noise of the camera shake detection unit 12 in the vicinity of the cutoff frequency fc.

According to the present embodiment, when image blur correction is performed by using the outputs of the shake detection units, image blur correction with a higher accuracy can be realized by reducing the output noise of the shake detection unit included in the target value.

Second Embodiment

The present embodiment will be described with reference to FIG. 8 and FIG. 9. The difference from the first embodiment will mainly be described, and a detailed description of the same matters will be omitted by using the same reference numerals and symbols used in the first embodiment. Such an omission for the same description will also be used in the embodiments to be described below.

Figure 8:
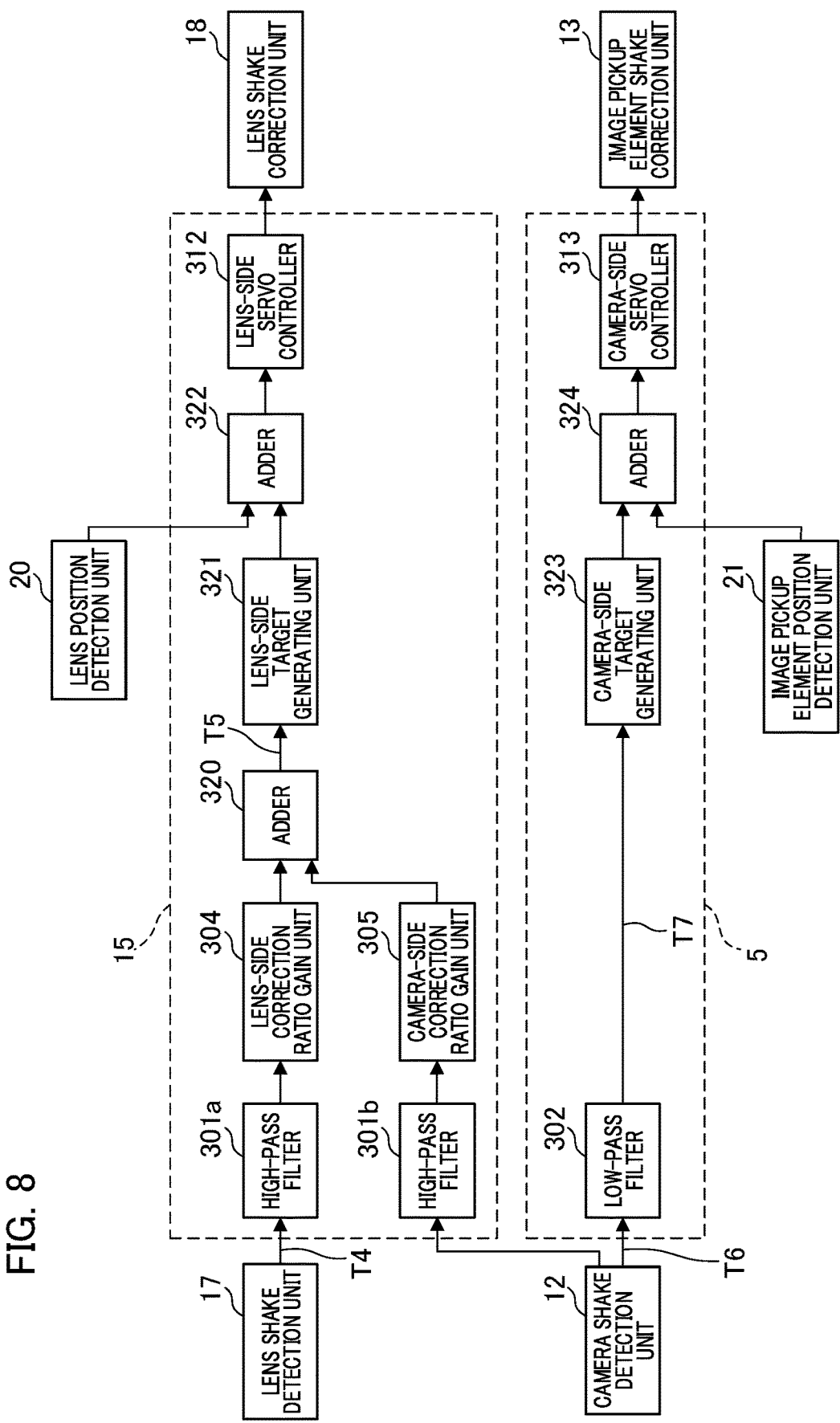
FIG. 8 is a block diagram illustrating a control configuration for image blur correction according to the second embodiment.

FIG. 8 is a block diagram illustrating a control configuration of image blur correction according to the present embodiment. The lens control unit 15 includes high-pass filters 301a and 301b, the correction ratio gain units 304 and 305, adders 320 and 322, a target generating unit 321, and the servo controller 312. The camera control unit 5 includes a low-pass filter 302, a target generating unit 323, an adder 324, and the servo controller 313.

In the image blur correction processing of the present embodiment, the lens control unit 15 acquires a shake detection signal (T4 in FIG. 8) of the lens shake detection unit 17 and a shake detection signal (T6 in FIG. 8) of the camera shake detection unit 12. The shake detection signal T4 of the lens shake detection unit 17 is processed by the high-pass filter 301a and subsequently input to the lens-side correction ratio gain unit 304. The output signal of the lens-side correction ratio gain unit 304 is input to the adder 320. The shake detection signal T6 of the camera shake detection unit 12 is processed by the high-pass filter 301b and subsequently input to the camera-side correction ratio gain unit 305. The output signal of the camera-side correction ratio gain unit 305 is input to the adder 320. The high-pass filters 301a and 301b have the same characteristics. Alternatively, each characteristic may be determined individually as required.

The adder 320 obtains and calculates each output signal of the correction ratio gain units 304 and 305, and the output signal (T5 in FIG. 8) is input to the target generating unit 321. The signal of the target value output from the target generating unit 321 is input to the adder 322. The adder 322 acquires the output signal of the target generating unit 321 and the position detection signal of the position detection unit 20, performs a difference calculation, and outputs the calculated deviation signal to the servo controller 312. The servo controller 312 generates and outputs a driving signal for driving the shake correction unit 18 based on the deviation signal.

In contrast, the camera control unit 5 acquires a shake detection signal (T6 in FIG. 8) of the camera shake detection unit 12. The shake detection signal T6 of the camera shake detection unit 12 is processed by the low-pass filter 302 (T7 in FIG. 8) and subsequently input to the target generating unit 323. The signal of the target value output from the target generating unit 323 is input to the adder 324. The adder 324 obtains the output signal of the target generating unit 323 and the position detection signal from the position detection unit 21, performs a difference operation, and outputs the calculated deviation signal to the servo controller 313. The servo controller 313 generates and outputs a driving signal for driving the shake correction unit 13 based on the deviation signal. In the present embodiment, the setting of the communication speed between the main body 100 and the lens unit 2 via the electric contact 14 is the same as that in the first embodiment.

Figure 9:
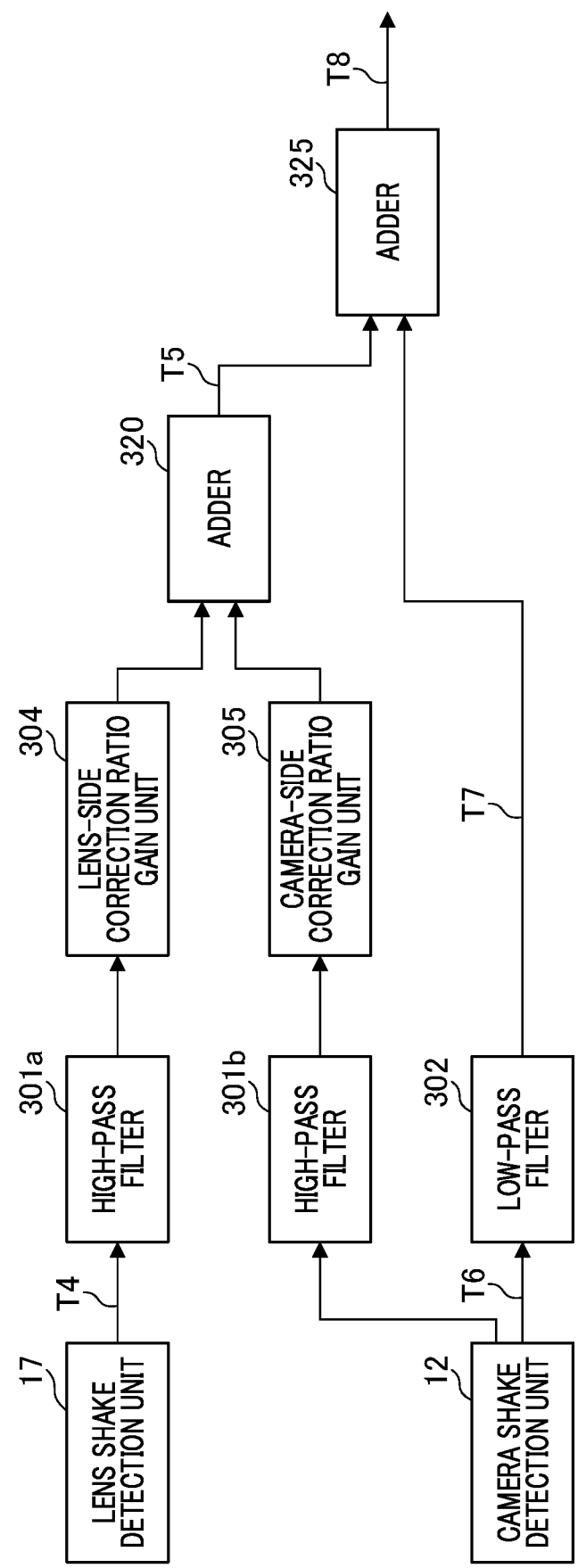
FIG. 9 illustrates the effect of image blur correction control according to the second embodiment.

With reference to FIG. 9, the effect for the image blur correction control according to the present embodiment will be described. FIG. 9 is a block diagram illustrating a configuration in which an output signal (T5) of the adder 320 and an output signal (T7) of the low-pass filter 302 are added by an adder 325 and a signal (T8) is output. An amount indicating the frequency characteristic of the low-pass filter 302 is denoted by "K". As shown in FIG. 9, the transmission characteristic from T4 (output of the lens shake detection unit 17) to T8 related to the output noise of the lens shake detection unit 17 are expressed by formula (1). Hence, the transmission characteristic related to the output noise from T4 to T8 of the lens shake detection unit 17 is the same as the characteristic of the solid line L1 shown in FIG. 3. Additionally, as shown in FIG. 9, the transmission characteristic related to the output noise of the camera shake detection unit 12 from T6 (output of the camera shake detection unit 12) to T8 is expressed by formula (2). Hence, the transmission characteristic related to the output noise of the camera shake detection unit 12 from T6 to T8 is the same as the transmission characteristic of the dashed line L2 shown in FIG. 3.

The cutoff frequency fc of the frequency characteristic K of the low-pass filter 302 of FIG. 9 is set the same as in the first embodiment. For the output signal of the lens shake detection unit 17, a component in a high frequency band is extracted, and no component in a low frequency band is extracted. For an output signal of the camera shake detection unit 12, only a component in the low frequency band is extracted. Specifically, although a signal component in the low frequency band of the shake detection means having a low performance in noise characteristic in the variation at the low frequency is not used, a signal component in the low frequency band of the shake detection means having a high performance in noise characteristic is used. As a result, it is possible to suppress degradation in performance of the noise characteristic in the low frequency band.

The configuration of the correction processing unit according to the present embodiment is as shown in FIG. 8 and the configuration is different from FIG. 9. The value obtained by integrating the signal T5 of FIG. 8 by the lens-side target generating unit 321 is used as a target value for image blur correction, and the shake correction unit 18 is driven. Additionally, a value obtained by integrating the signal T7 by the camera-side target generating unit 323 is used as a target value for image blur correction, and the driving of the shake correction unit 13 is performed. By driving the correction units, an effect that is almost the same as that of driving the shake detection unit by using the signal at T8 in FIG. 9 to serve as the target value for image blur correction is achieved. Hence, in the driving control for cooperatively operating the shake correction units 18 and 13, the noise density of the output noise of each detection signal of the lens shake detection unit 17 and the camera shake detection unit 12 included in the driving amount is the same as the characteristic indicated by the dashed-dotted line L5 in FIG. 4. Since the method for setting the correction ratio gains Pb and Pl in the present embodiment is the same as that in the first embodiment, the description thereof will be omitted.

In the present embodiment, the output noise of the shake detection means included in the target value of the image blur correction is reduced in the control of the image blur correction using a plurality of shake detection signals, and as a result, image blur correction with a higher accuracy can be performed. In the present embodiment, the low-pass filter 302 cuts off a high frequency component of the camera shake detection signal, and the camera-side target generating unit 323 generates a target value signal from the low frequency component. Accordingly, it suffices if the shake correction unit 13 is provided with a driving mechanism unit that follows only the low frequency component. Since the shake correction unit 13 has the driving mechanism unit of the image pickup element 6, the weight of the image pickup element needs to be reduced in providing the driving mechanism unit that follows the high frequency component. In the present embodiment, it suffices if the driving mechanism unit that follows only the low frequency component is provided, so that there is an advantage in that the degree of difficulty in designing the shake correction unit 13 is reduced.

Third Embodiment

Figure 10:
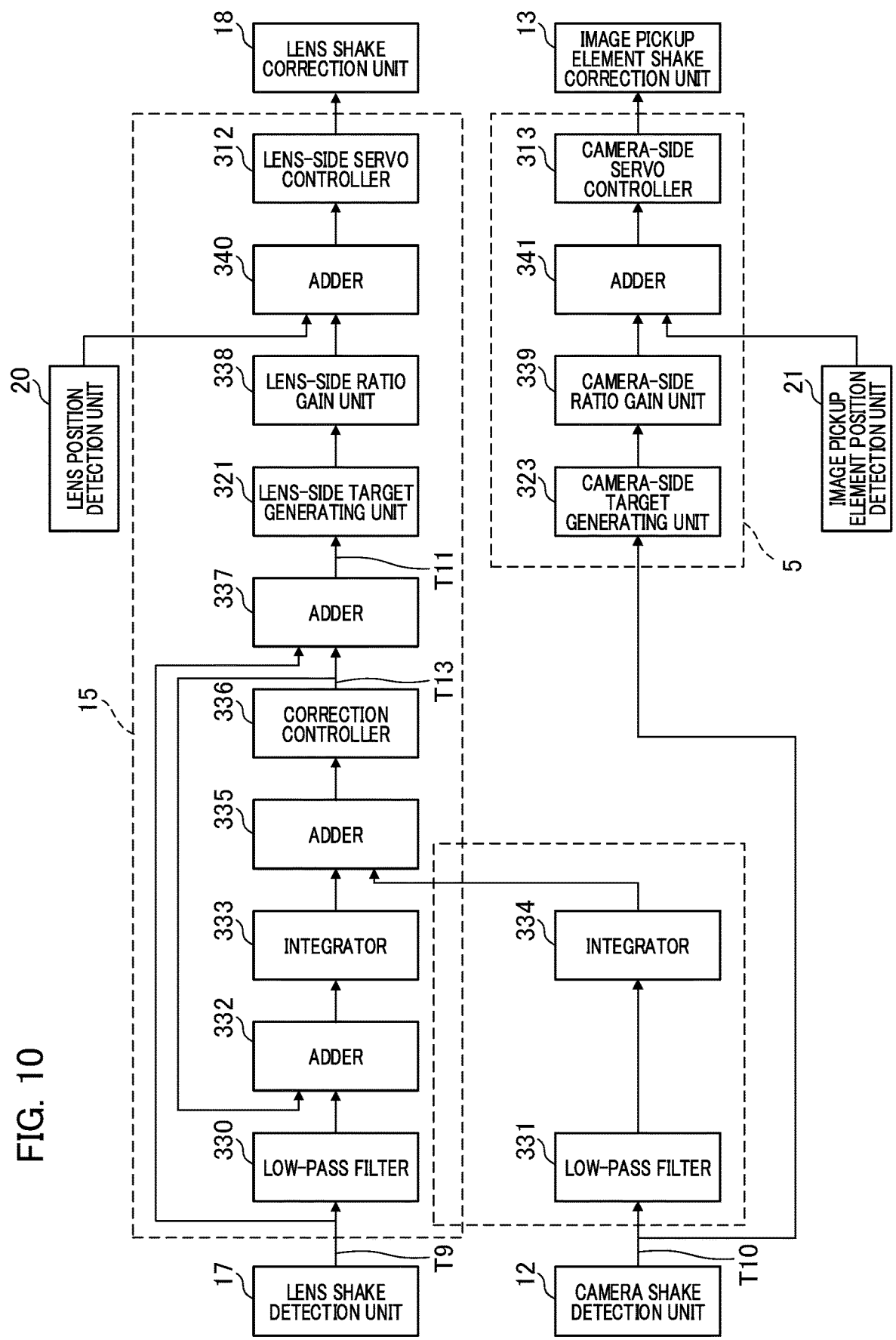
FIG. 10 is a block diagram illustrating a control configuration for image blur correction according to the third embodiment.
Figure 11A:
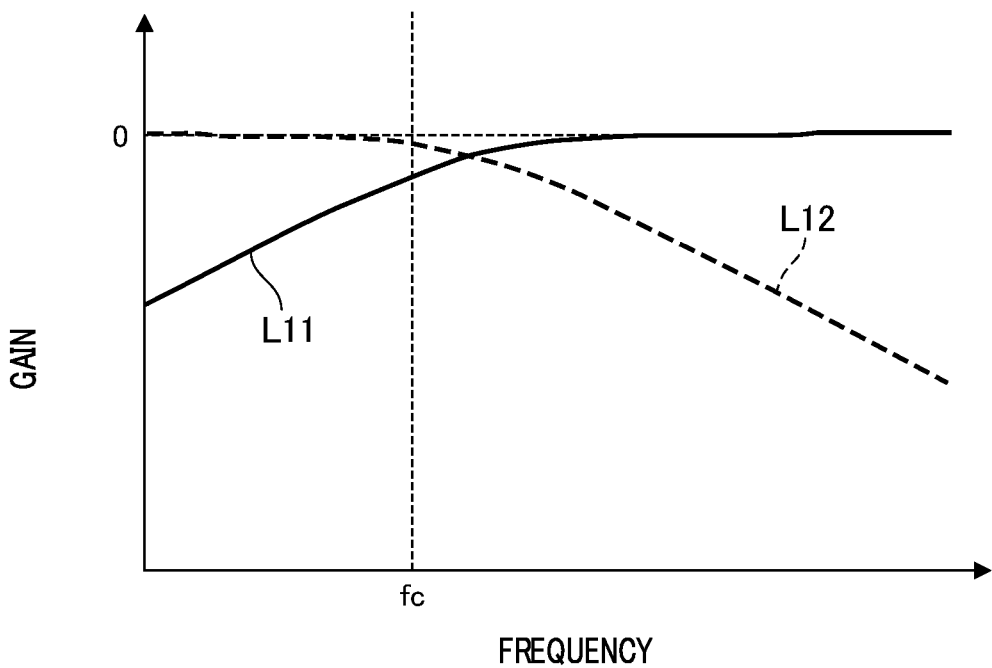
FIGS. 11A and 11B illustrate a frequency characteristic in target value correction performed by a shake correction unit according to the third embodiment.
Figure 11B:
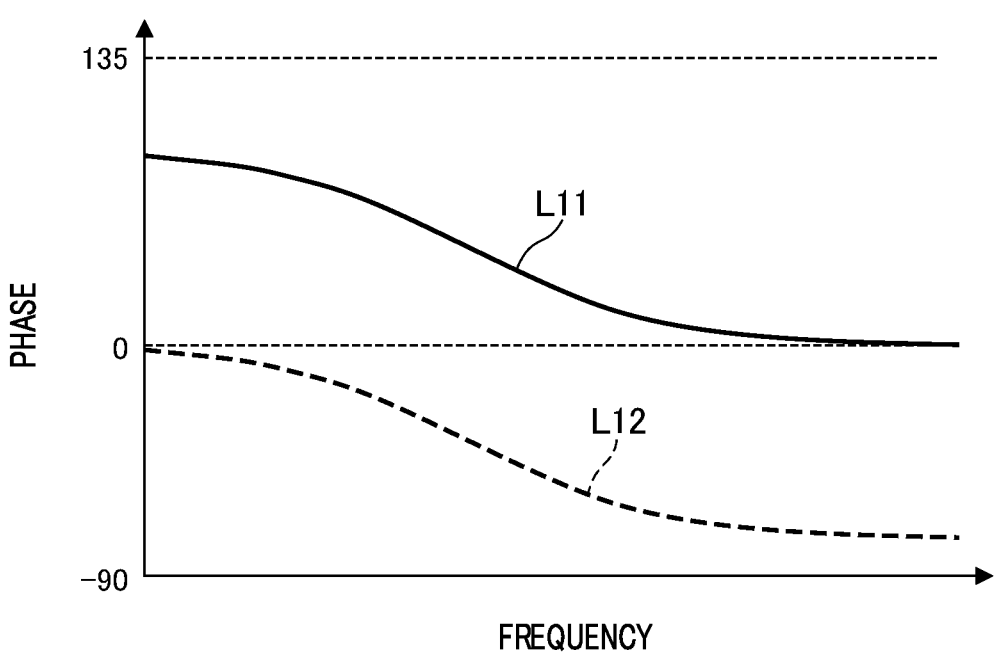
Figure 12:
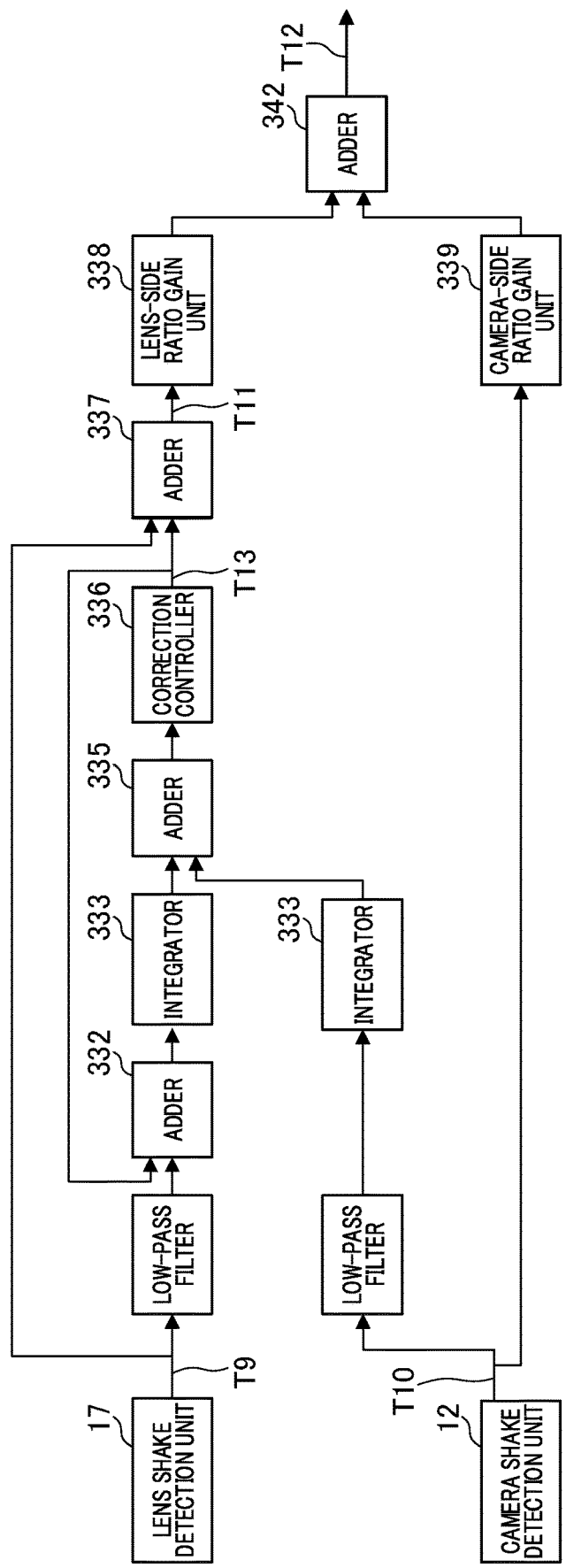
FIG. 12 illustrates the effect of the image blur correction control according to the third embodiment.

With reference to FIG. 10 to FIG. 12, the third embodiment of the present invention will be described. FIG. 10 is a block diagram illustrating a control configuration of image blur correction according to the present embodiment. The lens control unit 15 includes low-pass filters 330 and 331, adders 332, 335, 337, and 340, integrators 333 and 334, and a correction controller 336. The lens control unit 15 further includes the lens-side target generating unit 321, a lens-side ratio gain unit 338, and the lens side servo controller 312. The camera control unit 5 includes the camera-side target generating unit 323, a camera-side ratio gain unit 339, an adder 341, and the camera-side servo controller 313. The lens-side target generating unit 321 and the camera-side target generating unit 323 have the functions that are the same as those of the second embodiment.

In the image blur correction processing according to the present embodiment, the lens control unit 15 acquires a shake detection signal (T9 in FIG. 10) from the lens shake detection unit 17 and the low-pass filter 330 performs the processing. The output signal of the low-pass filter 330 is input to the adder 332. The adder 332 adds the output signal of the low-pass filter 330 and the signal from the correction controller 336 to be described below. The integrator 333 integrates the output signal of the adder 332, and the integrated signal is input to the adder 335.

Additionally, the lens control unit 15 acquires a shake detection signal (T10 in FIG. 10) from the camera shake detection unit 12 via the electric contact 14, and the low-pass filter 331 performs the processing. The output signal of the low-pass filter 331 is input to the integrator 334 and integrated. The output signal of the integrator 334 is input to the adder 335.

The adder 335 generates a signal obtained by subtracting the output signal of the integrator 333 from the output signal of the integrator 334, and outputs the generated signal to the correction controller 336. The signal output from the correction controller 336 is input to the adder 332 and the adder 337. The adder 337 adds the output signal of the correction controller 336 and the output signal of the lens shake detection unit 17, and the added signal is input to the lens-side target generating unit 321. The output signal of the lens-side target generating unit 321 is input to the lens-side ratio gain unit 338. The lens-side ratio gain unit 338 outputs a signal obtained by multiplying a signal of a target value by a predetermined correction ratio gain to the adder 340. The adder 340 acquires the output signal of the lens-side ratio gain unit 338 and a position detection signal of the position detection unit 20, performs a difference calculation, and outputs a deviation signal. The lens-side servo controller 312 generates a driving signal for driving the shake correction unit 18 based on the deviation signal, and outputs the driving signal.

In contrast, the camera control unit 5 acquires a shake detection signal (T10 in FIG. 10) from the camera shake detection unit 12, and inputs it to the camera-side target generating unit 323. The camera-side ratio gain unit 339 multiplies a signal of a target value generated by the camera-side target generating unit 323 by a predetermined correction ratio gain. The output signal of the camera-side ratio gain unit 339 is input to the adder 341. The adder 341 acquires an output signal of the camera-side ratio gain unit 339 and a position detection signal of the position detection unit 21, performs a difference calculation, and outputs a deviation signal. The camera-side servo controller 313 generates a driving signal for driving the shake correction unit 13 based on the deviation signal, and outputs the driving signal.

Next, the correction controller 336 will be described. Low frequency components of the shake detection signals of each of the lens shake detection unit 17 and the camera shake detection unit 12 are extracted by the low-pass filters 330 and 331. The integrators 333 and 334 convert each signal from which the low frequency component has been extracted into an angular signal from an angular velocity signal of shaking. The adder 335 performs a difference calculation between a shaking angle based on the detection signal of the lens shake detection unit 17 and a shaking angle based on the detection signal of the camera shake detection unit 12 to calculate a shake angle signal difference. The correction controller 336 calculates a correction amount (T13) of the shake detection signal based on the shaking angle signal difference, and outputs it to the adder 332.

As described above, the correction amount of the shake detection signal is based on the shake angle signal difference calculated from the lens shake detection signal and the camera shake detection signal, and correction is performed by negative feedback control. That is, the correction controller 336 is a feedback controller. Although any controller may be used in the application of the present invention, the present embodiment employs a PI controller configured by a proportional controller and an integral controller. By this configuration, the difference between the shake angle signal calculated based on the lens shake detection signal and the shake angle signal calculated based on the camera shake detection signal becomes zero in the low frequency band. This is because the shake angle signal is corrected in accordance with a feedback control amount by the correction controller 336.

The output signal of the correction controller 336 and the lens shake detection signal (T9) are input to the adder 337, where the low-frequency signal component of the lens shake detection signal is corrected. The corrected shake angle signal is input to the lens-side target generating unit 321.

Next, with reference to FIGS. 11A and 11B, the frequency characteristic in the target value correction performed by the shake correction unit 18 based on the correction amount of the shake detection signal will be described. FIG. 11A illustrates the frequency characteristic of the gain (vertical axis) and FIG. 11B illustrates the frequency characteristic of the phase (vertical axis). The horizontal axis in both FIGS. 11A and 11B represents the frequency. The graph shown by a solid line L11 indicates the transmission characteristic from T9 (output of the lens shake detection unit 17) to T11 shown in FIG. 10. The graph shown by a dashed line L12 indicates the transmission characteristic from T10 (output of the camera shake detection unit 12) to T11 in FIG. 10. However, a case in which no low-pass filters 330 and 331 exist in FIG. 10 is shown.

As can be seen from FIG. 11A, the transmission characteristic from T10 to T11, which is shown by the dashed line L12, is similar to the characteristic of the low-pass filter. That is, the low frequency component of the camera shake detection signal is passed and a high frequency component is cut off. Additionally, the transmission characteristic from T9 to T11 indicated by the solid line L11 is similar to the characteristic of the high-pass filter. That is, the low frequency component of the lens shake detection signal is cut off and the high frequency component of the lens shake detection signal is passed. The frequency characteristic from T10 to T11 is denoted by "K2". The output signal at T11 can be approximated by the following formula:

$$T11 \text{ signal} = (1-K2) \times \text{lens shake detection signal} + K2 \times \text{camera shake detection signal} \quad (3)$$

With reference to FIG. 12, the effect for image blur correction control according to the present embodiment will be described. FIG. 12 is a block diagram illustrating a configuration in which the output signal of the lens-side ratio gain unit 338 and the output signal of the camera-side ratio gain unit 339 are added by an adder 342. That is, the adder 342 adds a signal obtained by multiplying T11, which is the output signal of the adder 337 in FIG. 10, by the lens side ratio gain, and a signal obtained by multiplying the shake detection signal T10 of the camera shake detection unit 12 by the camera side ratio gain. The signal added by the adder 342 is denoted by "T12". The lens side ratio gain is denoted by "Pl*", and the camera side ratio gain is denoted by "Pb*". Both "Pl*" and "Pb*" are positive values, and their sum is 1.

Assuming that no low-pass filters 330 and 331 exist, the signal at T12 can be approximated by the following formula:

$$\text{Signal at } T12 = Pl^* \times (1-K2) \times \text{lens shake detection signal} + (Pb^* + Pl^* \times K2) \times \text{camera shake detection signal} \quad (4)$$

Hence, the transmission characteristic from T9 (output of the lens shake detection unit 17) to T12 and the transmission characteristic from T10 (output of the camera shake detection unit 12) to T12 can be approximated by the following formulae:

$$(\text{Transmission characteristic from } T9 \text{ to } T12) = Pl^* \times (1-K2) \quad (5)$$

$$(\text{Transmission characteristic from } T10 \text{ to } T12) = Pb^* + Pl^* \times K2 \quad (6)$$

Formula (5) of the transmission characteristic from T9 to T12 is the same as formula (1). Accordingly, the transmission characteristic related to the output noise of the lens shake detection unit 17 from T9 to T12 is the same as that shown by the solid line L1 in FIGS. 3A and 3B. Formula (6) of the transmission characteristic from T10 to T12 is the same as formula (2) above. Therefore, the transmission characteristic related to the output noise of the camera shake detection unit 12 from T10 to T12 is the same as that shown by the dashed line L2 in FIGS. 3A and 3B.

In FIG. 12, the method for setting the cutoff frequency fc of the frequency characteristic K2 from T10 to T11 is the same as that of the first embodiment. Only the high frequency band is extracted from the signal that is output from the lens shake detection unit 17, and the signal component in the low frequency band is replaced with the signal component in the low frequency band that is output from the camera shake detection unit 12. Specifically, the signal component in the low frequency band of the shake detection means that is low in the performance of the noise that is characteristic of the variation at the low frequency is replaced with the signal component of the shake detection means that is high in the performance of the noise characteristic. Therefore, it is possible to suppress the deterioration in performance of the noise characteristics in the low frequency band. The method for setting the camera-side ratio gain Pb* and the lens-side ratio gain Pl* in the present embodiment is the same as the method for setting the camera-side correction ratio gain Pb and the lens-side correction ratio gain Pl in the first embodiment. Thus, the high frequency noise included in the target value of the image blur correction can be suppressed.

A configuration of the correction processing unit according to the present embodiment is as shown in FIG. 10, and the configuration is different from FIG. 12. In FIG. 10, the lens-side target generating unit 321 integrates the signal of T11, the signal obtained by multiplying the integrated signal by the lens-side ratio gain is used as a signal of a target value, and the driving of the shake correction unit 18 is performed. The camera-side target generating unit 323 integrates the signal at T10, the signal obtained by multiplying the integrated signal by the camera-side ratio gain is used as a signal of a target value, and the driving of the shake correction unit 13 is performed. Such driving of the shake correction units 18 and 13 in FIG. 10 results in almost the same effect as driving the shake correction means by using the signal at T12 in FIG. 12 as a signal of the target value for image blur correction. Therefore, in the driving control for cooperatively operating the shake correction units 18 and 13, the noise density of the output noise of the detection signals of the lens shake detection unit 17 and the camera shake detection unit 12 included in the driving amount is the same as the characteristic indicated by the dashed-dotted line L5 in FIG. 4.

In the above description, the case assuming that no low-pass filters 330 and 331 exist has been described. When the frequency characteristic of the low-pass filters 330 and 331 is K3, formula (3) is as below:

Signal at $T11 = (1 - K2 \times K3) \times$ lens shake detection signal $+ K2 \times K3 \times$ camera shake detection signal    (7)

Based on formula (7), formula (5) and formula (6) are as follows:

(Transmission characteristic from $T9$ to $T12$) $= Pl^* \times (1 - K2 \times K3)$    (8)

(Transmission characteristic from $T10$ to $T12$) $= Pb^* + Pl^* \times K2 \times K3$    (9).

That is, relative to formulae (5) and (6), in formulae (8) and (9), the transmission characteristic is obtained by multiplying the frequency characteristic K2 by the frequency characteristic K3. Therefore, the transmission characteristics from T9 to T12 and from T10 to T12 are determined based on the frequency characteristic obtained by multiplying the frequency characteristic K2 and the frequency characteristic K3.

The cutoff frequency of the frequency characteristic K3 of the low-pass filters 330 and 331 is set equal to the cutoff frequency fc of the frequency characteristic K2. Accordingly, the frequency characteristic obtained by multiplying the frequency characteristic K2 and the frequency characteristic K3 can serve as a frequency characteristic close to a high-order low pass filter. For example, the case in which the frequency characteristic obtained by multiplying the frequency characteristic K2 and the frequency characteristic K3 has a frequency characteristic close to a low-pass filter of the second order or higher is the same as the case in which the low-pass filter 302 of the first embodiment is a filter of the second order or higher. Since the frequency band for camera shake is about 10 Hz or less, the amount of camera shake can be more accurately acquired by setting the frequency band of 10 Hz or less.

Additionally, based on the transfer/reception interval of the signal by the communication between the camera control unit 5 and the lens control unit 15, the camera control unit 5 or the lens control unit 15 determines the cutoff frequency of the frequency characteristic of the filter means in image blur correction. The cut-off frequency fc of the frequency characteristic obtained by multiplying the frequency characteristic K2 and the frequency characteristic K3 is set lower than the communication frequency at which the lens control unit 15 obtains the camera shake detection signal via the electric contact 14. This makes it possible to suppress the influence caused by the delay of the camera shake detection signal due to the speed of communication via the electric contact 14. Since the target value of image blur correction in the lens unit 2 is not adversely affected, image blur correction can be performed more accurately.

In the present embodiment, it is preferable that the lens-side ratio gain and the camera-side ratio gain are set to a ratio gain in which the noise density of the noise on the high-frequency side shown in FIG. 4 (dashed-dotted line L5) is reduced. If the target value for image blur correction exceeds the driving range of the shake correction unit, the correction performance may deteriorate. Accordingly, if the target value exceeds the driving range of one of the shake correction units 18 and 13, the other shake correction unit is driven to compensate for the shortage. In this case, after the driving ratio gain is determined so that a noise density on the high frequency side becomes low, a process for changing the ratio gain on the lens side or the camera side is performed. As a result, since the target value in image blur correction control is set to be within range of the driving of each shake correction unit, the deterioration of the image blur correction performance can be avoided.

According to the embodiment, it is possible to suppress the deterioration of the image blur correction accuracy due to the use of the detection signals of a plurality of shake detection means each having a difference in detection performance. In the image blur correction using a plurality of shake detection signals, shake detection with a higher accuracy is possible by reducing the noise in the output of the shake detection means included in the target value of the shake correction means. It is possible to provide an image blur correction apparatus and an image pickup apparatus that can perform more accurate correction based on the shake detection result.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2020-76854, filed Apr. 23, 2020 which is hereby incorporated by reference wherein in its entirety.

What is claimed is:

1. A shake detection apparatus comprising:
   first and second detectors configured to detect shaking;
   at least one processor and at least one memory functioning as:
   a signal processing unit configured to process first and second detection signals output by each of the first and second detectors,
   the signal processing unit comprising:
   a first filter unit configured to have a first transmission characteristic determined by a noise density ratio of the first and second detection signals;
   a second filter unit configured to have a second transmission characteristic in which a sum with a value of the first transmission characteristic is a predetermined value; and
   an output unit configured to output a shake detection signal generated based on a signal processed by the first filter unit and a signal processed by the second filter unit.

2. The shake detection apparatus according to claim 1, wherein the signal processing unit generates the shake detection signal by using a mixing ratio of the first detection signal and a mixing ratio of the second detection signal determined by the noise density ratio of the first detection signal to the sum of the noise density of the first detection signal and the noise density of the second detection signal.

3. The shake detection apparatus according to claim 2, wherein if the noise density ratio is between a first threshold and a second threshold, the signal processing unit multiplies a signal based on the first detection signal by a gain corresponding to the mixing ratio of the first detection signal, multiplies a signal based on the second detection signal by a gain corresponding to the mixing ratio of the second detection signal, and performs addition of a signal based on the first detection signal multiplied by a gain corresponding to the mixing ratio of the first detection signal and a signal based on the second detection signal multiplied by a gain corresponding to the mixing ratio of the second detection signal.

4. The shake detection apparatus according to claim 3, wherein if the noise density ratio is lower than the first threshold, the output unit outputs a signal based on the first detection signal, and
   wherein if the noise density ratio is higher than the second threshold, the output unit outputs a signal based on the second detection signal.

5. An image blur correction apparatus comprising:
   first and second detectors configured to detect shaking;
   a processor configured to process first and second detection signals output from each of the first and second detectors; and
   a corrector configured to acquire a shake detection signal and perform image blur correction,
   the processor comprising:
   a first filter unit configured to have a first transmission characteristic determined by a noise density ratio of the first and second detection signals;
   a second filter unit configured to have a second transmission characteristic in which a sum with a value of the first transmission characteristic is a predetermined value; and
   an output unit configured to output a shake detection signal generated based on a signal processed by the first filter unit and a signal processed by the second filter unit.

6. The image blur correction apparatus according to claim 5,
   wherein the processor comprises:
   a first multiplication unit configured to multiply the first detection signal by a first gain corresponding to a first correction ratio used for the image blur correction; and
   a second multiplication unit configured to multiply the first or second detection signal by a second gain corresponding to a second correction ratio used for the image blur correction,
   wherein the first gain and the second gain are both positive values and the sum is the predetermined value.

7. The image blur correction apparatus according to claim 6,
   wherein the processor comprises:
   a low-pass filter configured to process the first detection signal;
   a high-pass filter configured to process the second detection signal; and
   an adding unit configured to add an output of the low-pass filter and an output of the high-pass filter,
   wherein the sum of the values of the frequency characteristics of the low-pass filter and the high-pass filter is the predetermined value, and
   wherein the second multiplication unit multiplies the output of the adding unit by the second gain.

8. The image blur correction apparatus according to claim 6,
   wherein the processor comprises:
   a low-pass filter configured to process the first detection signal;
   a first high-pass filter configured to process the first detection signal; and
   a second high-pass filter configured to process the second detection signal,
   wherein the first multiplication unit multiplies an output of the first high-pass filter by the first gain, and
   wherein the second multiplication unit multiplies an output of the second high-pass filter by the second gain.

9. The image blur correction apparatus according to claim 6,
   wherein the processor comprises a generating unit configured to generate a signal of a target value for image blur correction based on an output obtained by adding an output of the first multiplication unit and an output of the second multiplication unit.

10. The image blur correction apparatus according to claim 7,
    wherein the low-pass filter has a cutoff frequency determined based on the characteristics of the noise densities of the first and second detection signals.

11. The image blur correction apparatus according to claim 8,
    wherein the low-pass filter has a cutoff frequency determined based on the characteristics of the noise densities of the first and second detection signals.

12. The image blur correction apparatus according to claim 5:

wherein the processor comprises:
a first low-pass filter configured to process the first detection signal;
a second low-pass filter configured to process the second detection signal; and
a correction control unit configured to correct the shake detection signal by a signal based on outputs of the first and second low-pass filters.

13. The image blur correction apparatus according to claim 12,
wherein the processor comprises an adding unit configured to add the output of the second low-pass filter and an output of the correction control unit,
wherein the correction control unit outputs a correction amount for the shake detection signal to the adding unit.

14. The image blur correction apparatus according to claim 13,
wherein the processor comprises a first generating unit configured to generate a signal of a first target value pertaining to image blur correction from the first detection signal.

15. The image blur correction apparatus according to claim 14,
wherein the processor comprises a second generating unit configured to generate a signal of a second target value pertaining to image blur correction based on an output obtained by adding the second detection signal and the output of the correction control unit.

16. The image blur correction apparatus according to claim 15,
wherein the processor comprises a first multiplication unit configured to multiply the signal of the first target value by a first gain, and a second multiplication unit configured to multiply the signal of the second target value by a second gain, and
wherein the first and second gains are determined based on the noise density ratio of the first and second detection signals.

17. The image blur correction apparatus according to claim 12,
wherein the correction control unit has a proportional controller and an integral controller, and performs feedback control on the output of the second low-pass filter.

18. The image blur correction apparatus according to claim 5,
wherein the image blur correction apparatus is an image pickup apparatus.

19. The image blur correction apparatus according to claim 18 comprising:
first and second correctors configured to perform image blur correction; and
a controller configured to control the first corrector in accordance with a first instruction signal and control the second corrector in accordance with a second instruction signal.

20. The image blur correction apparatus according to claim 19,
wherein the controller generates a control target signal for image blur correction,
wherein the first instruction signal is a signal obtained by multiplying the control target signal by a first gain corresponding to a driving ratio of the first corrector, wherein the second instruction signal is a signal obtained by multiplying the control target signal by a second gain corresponding to a driving ratio of the second corrector, and
wherein the first and second gains are both positive values and the sum is the predetermined value.

21. The image blur correction apparatus according to claim 20,
wherein the controller generates the control target signal based on a signal obtained by adding a first signal obtained by multiplying the first detection signal by a gain corresponding to a first correction ratio and a second signal obtained by multiplying a signal obtained by adding an output of the low-pass filter that processes the first detection signal and an output of the high-pass filter that processes the second detection signal by a gain corresponding to a second correction ratio.

22. The image blur correction apparatus according to claim 20,
wherein the controller determines the values of the first and second gains corresponding to the driving ratio from driving ranges of the first and second correctors.

23. The image blur correction apparatus according to claim 19,
wherein the controller controls the first corrector in accordance with the first instruction signal generated based on an output of the low-pass filter that processes the first detection signal, and
wherein the controller controls the second corrector in accordance with the second instruction signal generated based on a signal obtained by adding a signal obtained by multiplying an output of the high-pass filter that processes the first detection signal by a gain corresponding to the first correction ratio and a signal obtained by multiplying the output of the high-pass filter that processes the second detection signal by a gain corresponding to the second correction ratio.

24. The image blur correction apparatus according to claim 19,
wherein the controller controls the first corrector in accordance with the first instruction signal generated based on the first detection signal, and
wherein the controller controls the second corrector in accordance with the second instruction signal generated based on an output of a correction control unit that corrects the shake detection signal by a signal based on an output of the first low-pass filter that processes the first detection signal and an output of the second low-pass filter that processes the second detection signal, and the second detection signal.

25. The image blur correction apparatus according to claim 19,
wherein the first corrector performs image blur correction by driving an image pickup element, and
wherein the second corrector performs image blur correction by driving an optical member configuring an imaging optical system.

26. The image blur correction apparatus according to claim 25, comprising a lens device having the second detector and the second corrector and a main body on which the lens device can be mounted, and having the first detector and the first corrector.

27. The image blur correction apparatus according to claim 26,
wherein the controller has the first and second controllers, wherein the first controller provided in the main body transmits and receives a signal to and from the second controller provided in the lens device via a communication unit, and wherein the first or second controller determines a cutoff frequency in the frequency characteristic of a filter unit based on an interval of signal transfer/reception by the communication unit.

28. The image blur correction apparatus according to claim 27, wherein the cutoff frequency is determined to be a value lower than a communication frequency in the acquisition of the first detection signal from the first controller by the second controller.

29. A shake detection method executed by a shake detection apparatus comprising first and second detectors that detect shaking, and a signal processing unit that processes first and second detection signals output from each of the first and second detectors, the shake detection method comprising:

performing signal processing for the detecting signal by a first filter unit having a first transmission characteristic determined by the noise density ratio of the first and second detection signals, in the signal processing unit;

performing signal processing for the detecting signal by a second filter unit having a second transmission characteristic in which a sum with a value of the first transmission characteristic is a predetermined value, in the signal processing unit; and outputting a shake detection signal generated based on a signal processed by the first filter unit and a signal processed by the second filter unit, in the signal processing unit.

* * * * *